United States Patent
Peterson et al.

(10) Patent No.: US 9,988,097 B2
(45) Date of Patent: Jun. 5, 2018

(54) FLOORING FOR VEHICLE DECKS AND MANUFACTURED HOUSING

(71) Applicants: John Peterson, Eugene, OR (US); James Lambert, Eugene, OR (US)

(72) Inventors: John Peterson, Eugene, OR (US); James Lambert, Eugene, OR (US)

(73) Assignee: SABALITO LLC, Springfield, OR (US)

(*) Notice: Subject to any disclaimer, the term of this patent is extended or adjusted under 35 U.S.C. 154(b) by 0 days. days.

(21) Appl. No.: 14/565,279

(22) Filed: Dec. 9, 2014

(65) Prior Publication Data
US 2015/0203160 A1    Jul. 23, 2015

Related U.S. Application Data

(60) Provisional application No. 61/914,923, filed on Dec. 11, 2013.

(51) Int. Cl.
*B62D 25/20* (2006.01)
*B32B 37/22* (2006.01)
(Continued)

(52) U.S. Cl.
CPC ............... *B62D 25/20* (2013.01); *B32B 3/06* (2013.01); *B32B 7/12* (2013.01); *B32B 21/14* (2013.01);
(Continued)

(58) Field of Classification Search
CPC ......... B32B 21/14; B32B 29/002; B32B 3/06; B32B 2262/101; B60R 13/01; B62D 25/20; B62D 25/2054; E04F 15/107

USPC ............................................... 296/193.07
See application file for complete search history.

(56) References Cited

U.S. PATENT DOCUMENTS 4,854,610 A * 8/1989 Kwiatek .............. B31D 1/021
156/234
5,702,827 A * 12/1997 Itoh .................... B32B 27/32
428/517
(Continued)

FOREIGN PATENT DOCUMENTS

KR    100786335    12/2007
WO    9640515    12/1996
(Continued)

*Primary Examiner* — Pinel E Romain

(57) ABSTRACT

A flooring product has multiple planar single piece substrate components, each with opposing straight longitudinal and lateral edges. A first lateral edge of a second of the substrate components abuts a first lateral edge of a first of the substrate components to form a common seam. The first and second of the substrate components are adjacent relative to a sequential array of multiple substrate components running parallel to the pair of longitudinal edges. The product has a pair of laminate component affixed to each side of each of the substrate components continuously over the sequential array thereof. The laminate components strengthen the product in relation to bearing a load applied to the second surface thereof and each of the common seams. The flooring product may be cut to lengths for accommodating overall lengths of recreational vehicles, trailers or manufactured housing units and thus reduces manufacturing costs associated therewith.

21 Claims, 23 Drawing Sheets

(51) Int. Cl.
  *E04B 1/343* (2006.01)
  *E04F 15/10* (2006.01)
  *B32B 7/12* (2006.01)
  *B32B 21/14* (2006.01)
  *B32B 29/00* (2006.01)
  *B32B 3/06* (2006.01)
  *B60R 13/01* (2006.01)
  *B32B 38/00* (2006.01)

(52) U.S. Cl.
  CPC ............ *B32B 29/002* (2013.01); *B32B 37/22* (2013.01); *B62D 25/2054* (2013.01); *E04B 1/34336* (2013.01); *E04F 15/107* (2013.01); *B32B 38/0004* (2013.01); *B32B 2255/26* (2013.01); *B32B 2262/101* (2013.01); *B32B 2317/16* (2013.01); *B32B 2471/00* (2013.01); *B32B 2605/003* (2013.01); *B32B 2607/00* (2013.01); *B60R 13/01* (2013.01); *Y10T 156/1084* (2015.01); *Y10T 428/197* (2015.01)

(56) References Cited

U.S. PATENT DOCUMENTS

| | | | |
|---|---|---|---|
| 6,546,694 B2* | 4/2003 | Clifford | B32B 15/14 428/138 |
| 7,055,892 B2* | 6/2006 | Buchholz | B62D 33/04 296/186.1 |
| 8,926,784 B2* | 1/2015 | Sumi | B29C 47/0019 156/285 |
| 2010/0295334 A1 | 11/2010 | Chorney et al. | |
| 2014/0077518 A1* | 3/2014 | Preisler | B60N 2/6009 296/37.5 |
| 2014/0077530 A1* | 3/2014 | Preisler | B60N 2/6009 296/193.07 |
| 2018/0001936 A1 | 1/2018 | Peterson et al. | |

FOREIGN PATENT DOCUMENTS

| | | |
|---|---|---|
| WO | 9910220 | 3/1999 |
| WO | 2013167171 | 11/2013 |

* cited by examiner

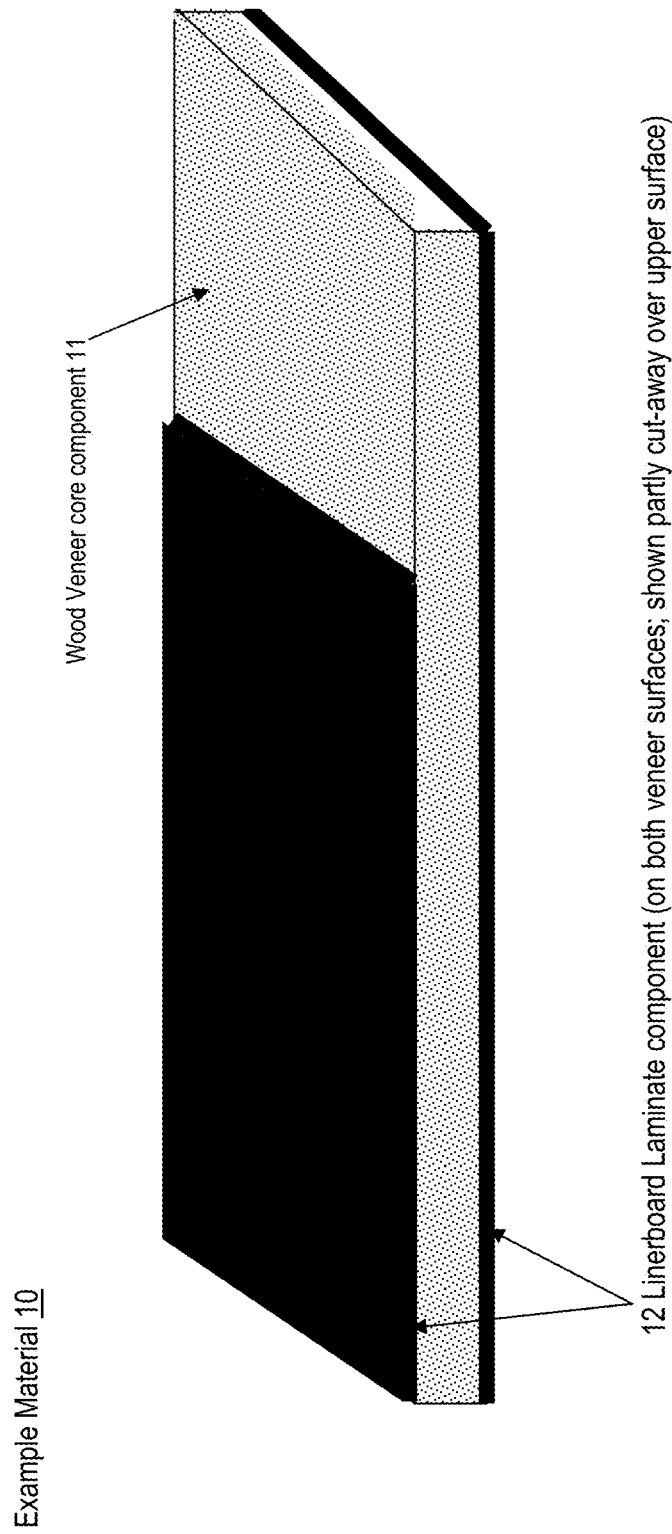

Example Laminate Storage Rolls 32

Example Core Substrate Storage 31 and Handler 33

Example Heated Roller Press 44

Example Flying Saw 37

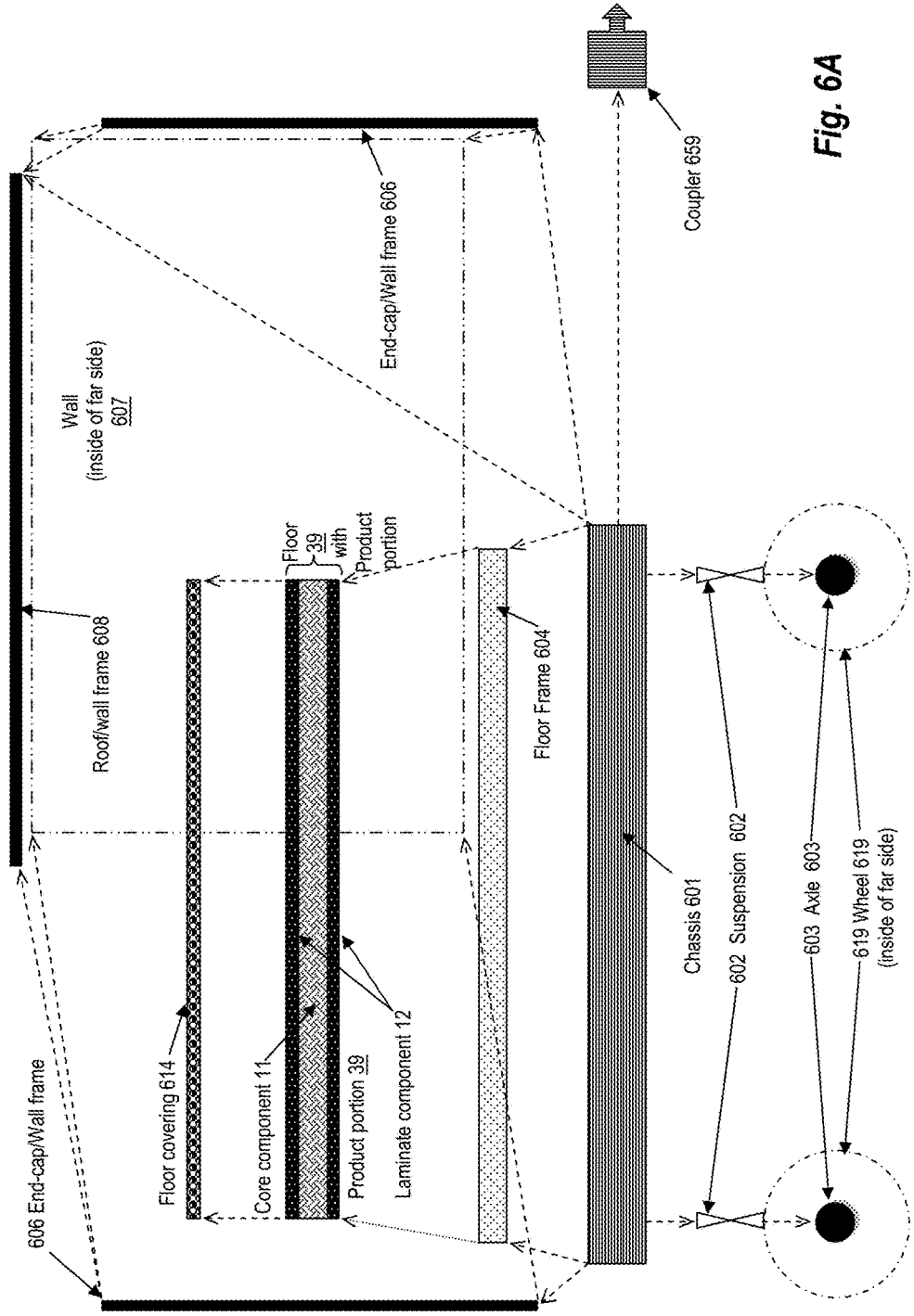

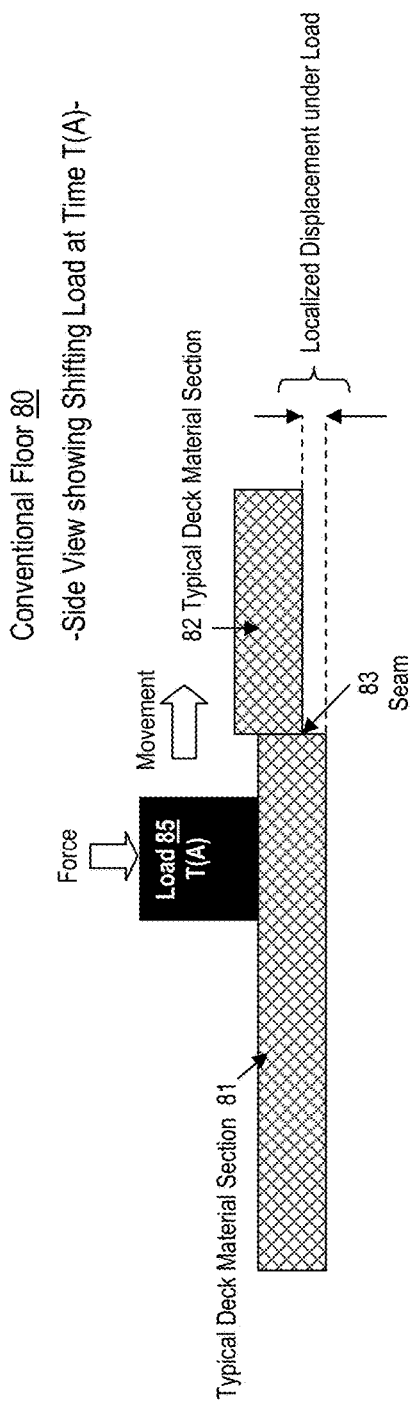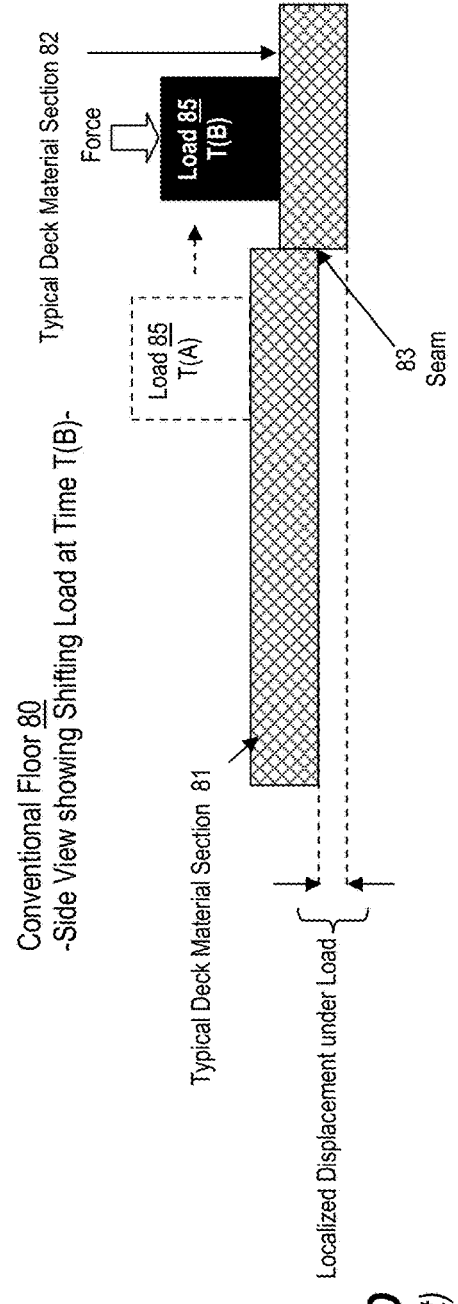

FLOORING FOR VEHICLE DECKS AND MANUFACTURED HOUSING

CROSSREFERENCE

This application claims priority to U.S. provisional patent application No. 61/914,923, filed on Dec. 11, 2013, entitled "FLOORING FOR VEHICLE DECKS AND MANUFACTURED HOUSING," by Peterson, John and Lambert, James, the content of which is incorporated herein by reference in its entirety.

TECHNOLOGY

An embodiment of the present invention relates generally to products and production processes for vehicles and manufactured housing. More specifically, an example embodiment of the present invention relates to flooring products for use in recreational vehicles and manufactured housing.

BACKGROUND

Vehicles such as recreational vehicles (RVs) and trailers towed by motorized vehicles, as well as manufactured housing units (MHUs), typically have a floor frame, which is securely bolted or otherwise mechanically fastened to the vehicle chassis or the lower horizontal load-bearing frame of the MHU. A lower surface of the floor frame thus abuts at least a significant portion of an upper surface of the chassis, etc. to which it is fastened. An upper surface of the floor frame, opposite from the lower surface thereof, is typically covered by multi-piece deck flooring material, which itself is then covered by a floor such as carpeting, a vinyl or other flooring material or the like.

In manufacturing and assembling RVs and MHUs, each of the multiple pieces of the deck flooring materials must be staged and moved into position to begin installing the floor. Further, each of the multiple deck flooring materials must be carefully aligned together as the floor is installed. The multiple pieces typically come in standard lengths. Thus, the number of the multiple pieces of deck flooring required for a given RV/MHU floor depends on the size of the vehicle being manufactured and assembled.

The staging and the moving of each the multiple pieces of deck flooring and the careful coordination thereof, and the careful alignment of each of the multiple pieces adds significant cost, labor and latency associated with the manufacture and assembly of RVs/MHUs.

The deck flooring materials are selected based on their characteristics for use in manufacturing RVs, trailers and MHUs. For example, typical characteristics significant in selecting deck flooring materials for RV, trailer and MHU production include their strength in relation to bearing a load, durability, moisture resistance, and the efficiency, ease and/or cost-effectiveness with which the selected deck flooring material may be used in manufacturing an MHU, trailer or RV. Deck flooring materials with high load-bearing strength, high durability and good moisture resistance attributes are typically thus selected, if the materials may also be used cost-effectively in the production.

Notwithstanding the general benefits of these characteristics of the materials typically selected for vehicle manufacturing applications however, they may produce floors which, when walked on or otherwise traversed or loaded during use may present less than desirable experiences to users. Plain wood veneer panels for example, such as may also be used for manufacturing plywood may provide a high load-bearing strength characteristic and thus may typically be selected as a floor decking material in vehicle manufacturing. As such multiple separate sheets are typically laid end-to-end in producing the vehicle floor, the seams between the sheets may be perceived.

As RV users walk across the deck for example, they may shift their weight from one foot to the other and at one point, the load borne by the floor may shift from a first wood deck sheet to a second wood deck sheet across a common seam separating them. The second sheet may thus be pushed downward somewhat (e.g., towards the upper surface of the chassis, etc.) as it is loaded. Substantially at the same time, the first sheet may lift up somewhat (e.g., away from the upper surface of the chassis, etc.) as it is unloaded (e.g., as the walker's weight is shifted off of it). Even if the movement of each of the sheets along their common seam is slight, it may cause undesirable movement and squeaking or other noise.

However slight such movement of each of the plain wood veneer sheets along their common seam may be, users may perceive an associated motion and the uneven edges of each of the sheets along their common seam may also form an obstruction, which could be inconvenient or hazardous. And while they may provide high load-bearing strength relative to other materials, the plain wood veneer sheets may themselves each flex somewhat upon loading even apart from their edges, an associated motion of which users may perceive as a slight flexing, bounce or instability. These associated motions may all be considered unpleasant, annoying or vexing.

Further, such movements may also be perceived acoustically and/or haptically, e.g., as squeaks, pops, chaffing or other noises or vibrations. Some vehicle floors may be covered with carpet, which may dampen, but not eliminate some of the noise and vibration and/or the perception of the associated motions. Other floor decking materials such as vinyl vehicle floors may flex or move with less noise than end-to-end wood veneer sheets but may have higher levels of perceived motion associated therewith and/or less load-bearing strength relative to the plain wood veneer approach. Thus, using carpeting or different conventional materials may be only partially palliative.

Approaches described in this section may, but have not necessarily been conceived or pursued previously. Unless otherwise indicated, approaches mentioned (or issues identified in relation thereto) should not to be assumed as recognized or admitted in any alleged prior art merely by inclusion in this section.

SUMMARY

It would be useful to produce singular, unitary pieces of deck flooring materials and floor decking made therewith for use in vehicles such as RVs and trailers and in MHUs and thus, to reduce costs, labor and latency associated with their manufacture and assembly. It would also be useful if seams between adjacent core components of the flooring materials were imperceptible by users of floors made therewith. Further, it would be useful to deter, prevent or minimize localized vertical displacement of floors relative to the seams between its adjacent core components and resulting motion, noise, vibration and/or obstruction.

An example embodiment of the present invention relates to a deck flooring product, which may be used in vehicles such as RVs and trailers and in MHUs. The product comprises multiple planar single piece substrate components, each with opposing straight longitudinal and lateral edges. A first lateral edge of a second of the substrate components abuts a first lateral edge of a first of the substrate components to form a common seam. The first and second of the substrate components are adjacent relative to a sequential array of multiple substrate components running parallel to the pair of longitudinal edges. The product has a pair of laminate component affixed to each side of each of the substrate components continuously over the sequential array thereof. The laminate components strengthen the product in relation to bearing a load applied to the second surface thereof and each of the common seams. The flooring product may be cut to lengths for accommodating overall lengths of recreational vehicles, trailers or manufactured housing units and thus reduces manufacturing costs associated therewith.

The single-piece construction that characterizes materials and products related to example embodiments of the present invention significantly simplify, streamline and smooth RV, trailer and MHU manufacturing and assembly processes and reduce costs associated therewith.

Example embodiments relate to a process and a system for manufacturing the product. An example process comprises arraying a linear sequence of each of the plurality of planar substrate components wherein, in a direction of a movement of the linear sequence parallel to each of a pair of opposite longitudinal edges, a trailing lateral edge of a first of the planar substrate components abuts a leading edge of a second of the planar substrate components. The pair of linear laminate components is fed continuously in a direction and at a speed that matches the movement of the linear sequence of substrate components. The linear laminate components have a thickness between a first side and a second side opposite from the first side thereof and a width between two parallel longitudinal edges thereof. The adhesive component is applied continuously to each side of each of the substrate components in the linear sequence thereof and/or to the second side of the linear laminate component.

Continuing the process, each side of each of the substrate components is attached to a side of the pair of linear laminate components facing the substrate components to form an intermediate assembly. The intermediate assembly has opposite outer surfaces comprising the outer surface of the laminate components. The outer surfaces of the intermediate assembly are mechanically compressed. During the mechanical compression thereof, the outer surfaces of the intermediate assembly are heated at the same time. Upon the simultaneous mechanical compression and heating, the substrate component and the laminate components are securely affixed to each other to form the product. In an example embodiment, the product is cut to size in relation to length. The length can be cut to accommodate the total length of a typical RV, trailer or MHU.

In an example embodiment, a manufacturing system performs the process for producing the product. Example embodiments also relate to RV, trailer and MHU assemblies, which may be manufactured using the product.

The single-piece construction characteristic of the materials and products related to example embodiments of the present invention significantly simplify, streamline and smooth RV, trailer and MHU manufacturing and assembly processes and reduce costs associated therewith. Moreover, example embodiments of the present invention provide deck flooring products strengthened by the laminating component attached to core components and resist localized displacement from loads shifting relative to seams between adjacent portions of the core components. The floors incorporating products according to an example embodiment are thus operable for bearing loads that shift from one position on the floor to another without significant vertical displacement resulting therefrom. Moreover, this feature is independent and irrespective of where on the floor the load may begin shifting, and where a given shifting may end in relation to any of the seams.

Example embodiments of the present invention thus produce materials and floor decking made therewith for use in vehicles such as RVs and trailers and in MHUs. Example embodiments of the present invention produce materials and floor decking made therewith, in which seams between adjacent core components of the flooring materials are substantially imperceptible by users of the floors. Further, example embodiments of the present invention produce materials and floor decking made therewith, which are operable for deterring, preventing and/or minimizing localized vertical displacement of floors relative to the seams between its adjacent core components and motion, noise, vibration and/or obstruction that could otherwise result in relation to such displacement.

By necessity, this summary omits details and presents simplifications and generalizations. Thus, artisans of ordinary skill in related technologies should appreciate that this summary is illustrative and is not intended to be in any way limiting and should realize other aspects, inventive features, and advantages of embodiments of the present invention, defined solely by the claims, with reference to the non-limiting description of example embodiments set forth below.

BRIEF DESCRIPTION OF THE DRAWINGS

Embodiments of the present invention are described herein with reference to the accompanying drawing figures. Unless stated otherwise, no particular scale is used. In each figure (FIG.) of these drawings, like reference characters refer to like elements, and:

FIG. 1 depicts an example material for use in a vehicle deck floor product, according to an embodiment of the present invention;

FIG. 6A depicts an exploded and partially cut-away side view of an example trailer assembly, according to an embodiment of the present invention;

FIG. 8C depicts a side view of a conventional floor with a shifting load at the first time (as shown in FIG. 8A); and FIG. 8D depicts a side view of the conventional floor with the shifting load (shown in FIG. 8C) at the second time.

DESCRIPTION OF EXAMPLE EMBODIMENTS

Figure 2A:
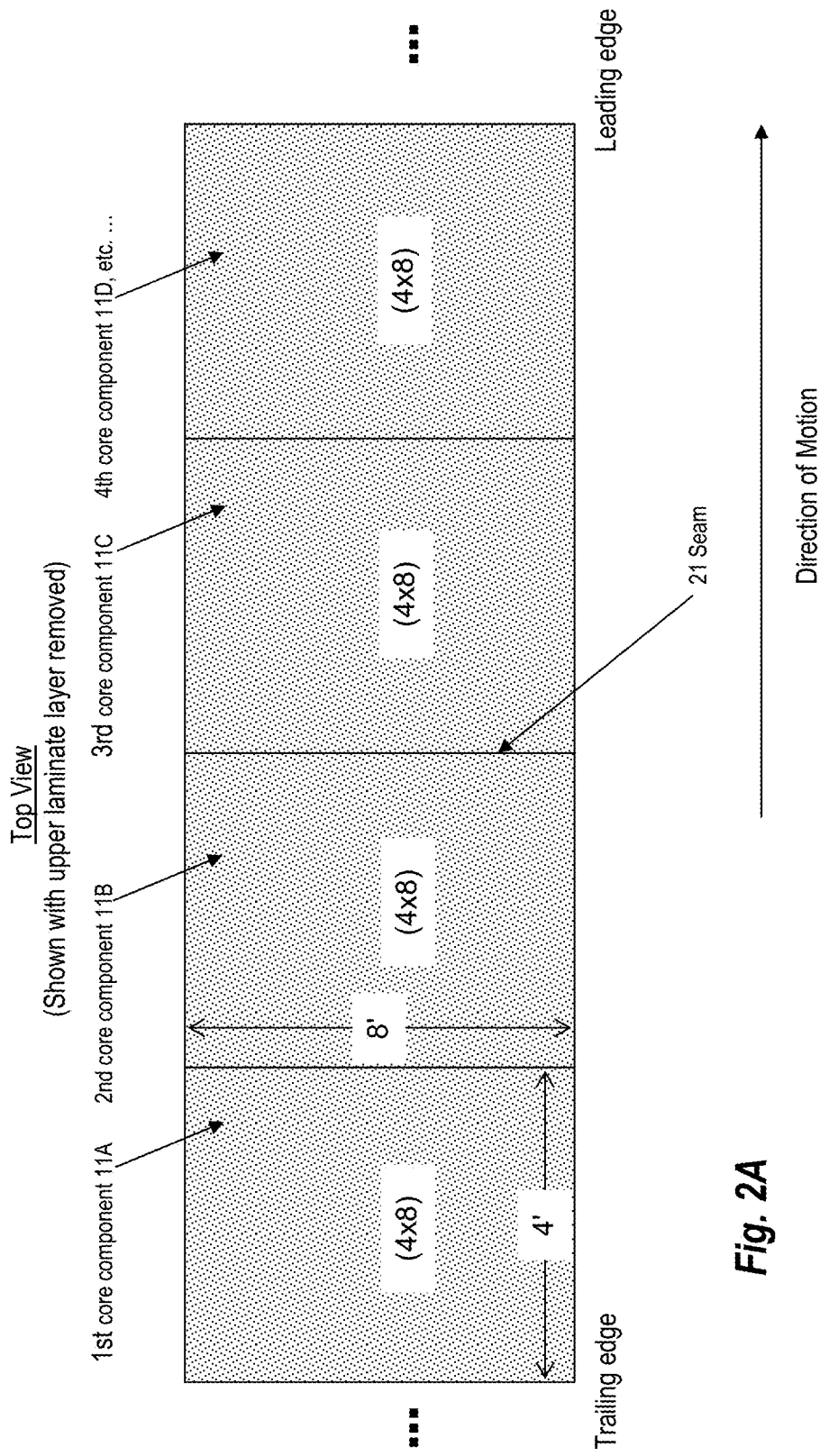
FIG. 2A depicts an example laminated product for use in a vehicle deck floor from a top view, according to an embodiment of the present invention.

Example embodiments of the present invention are described herein, in relation to a deck flooring product, which may be used in vehicles such as recreational vehicles (RVs) and trailers and in manufactured housing units (MHUs). Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and materials have not been described in detail so as not to unnecessarily obfuscate, obscure, obstruct or obfuscate aspects of the example embodiments of the present invention described herein.

An example embodiment of the present invention relates to a single piece deck flooring product, which may be used in vehicles such as RVs and trailers and in MHUs. The product comprises a plurality of planar core substrate components (e.g., veneer, fiberboard, plywood, etc.), each of which has opposing straight longitudinal and lateral edges. A first lateral edge of a second of the substrate components abuts a first lateral edge of a first of the substrate components to form a common seam between them. The first and second of the substrate components are adjacent relative to a sequential array of multiple substrate components, which runs in a direction parallel to the pair of longitudinal edges. The product has a pair of laminate components affixed to the outer surfaces of each of the substrate components continuously over the sequential array thereof. The laminate components strengthen the product in relation to bearing a load applied to the second surface thereof and each of the common seams. The laminate components may be affixed to each of the core substrate components with an adhesive component. The length of the product may be cut to accommodate an overall dimension (e.g., length, width) of an RV, trailer or MHU as a single piece deck flooring product.

Example Material and Product

FIG. 1 depicts an example material 10 for use in a vehicle deck floor product, according to an embodiment of the present invention. Material 10 comprises a core, which may be implemented as a planar substrate component with opposite straight longitudinal edges, and a first lateral straight edge and a second lateral edge opposite from the first lateral edge. Material 10 also comprises a pair of laminate components affixed to each side of the substrate component. The upper laminate component 12 is shown in FIG. 1 as partially cut away, to show the core substrate component.

Figure 2B:
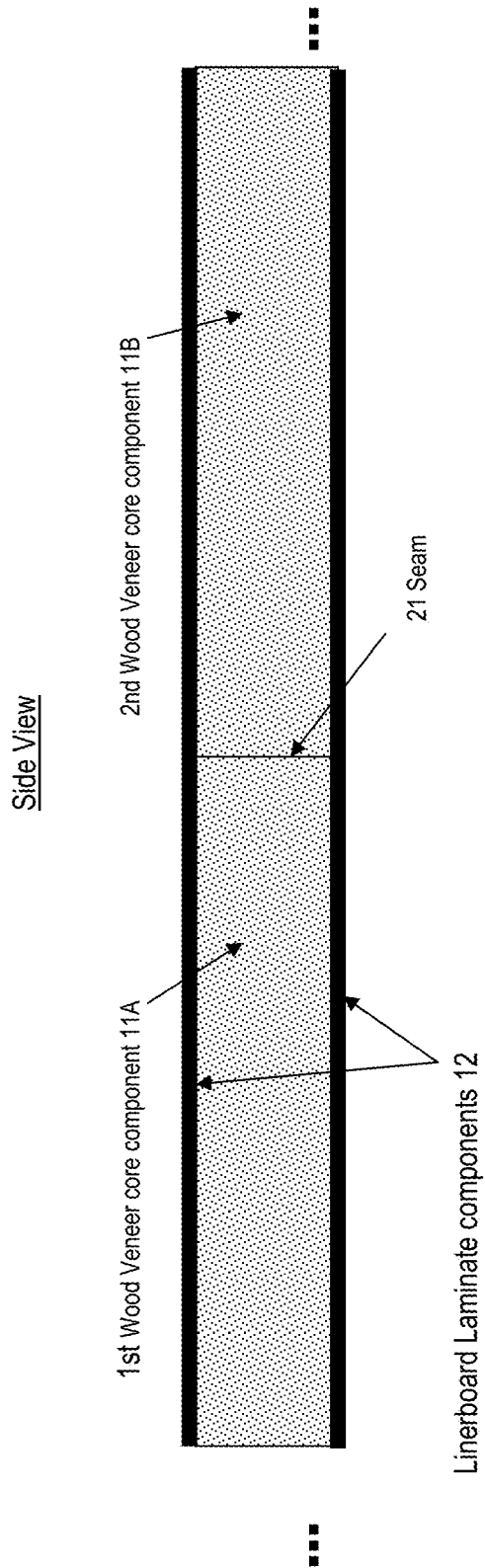
FIG. 2B depicts the example laminated product for use in a vehicle deck floor from a side view, according to an embodiment of the present invention.

FIG. 2A depicts an example laminated product 20 for use in a vehicle deck floor from a top view, and FIG. 2B depicts the example laminated product 20 from a side view, according to an embodiment of the present invention. Product 20 has a plurality of (multiple) planar substrate components. Each of the substrate components has opposite straight longitudinal edges, and a first lateral straight edge and a second lateral edge opposite from the first lateral edge. FIG. 2A depicts the top view of the product with the upper laminate layer 12 removed to show the core components 11A-11D, etc. and the seams 21.

The first lateral edge of a second of the multiple substrate components 11A abuts the first edge of a first of the substrate components 11B to form a seam 21, which is common to each. The first and the second of the multiple substrate components 11A and 11B are adjacent to each other in relation to a sequential array of the plurality of substrate components, which runs in a direction parallel to the pair of longitudinal edges of the product 20. The sequential array may continue in each direction parallel to the longitudinal edges (as denoted by the ellipses in FIG. 2A and FIG. 2B)

Product 20 also has a laminate component 12 affixed to the each side of each of the multiple substrate components 11A and 11B, etc. continuously over the sequential array thereof. The laminate components strengthen each of the plurality of substrate components in relation to bearing a load applied to the second surface thereof and over each of the common seams. The product 20 may also comprise an adhesive component (e.g., adhesive 43, FIG. 4), with which the laminate component 12 and the core substrate components 11A and 11B may be affixed together, e.g., with pressure and/or heat.

Figure 2C:
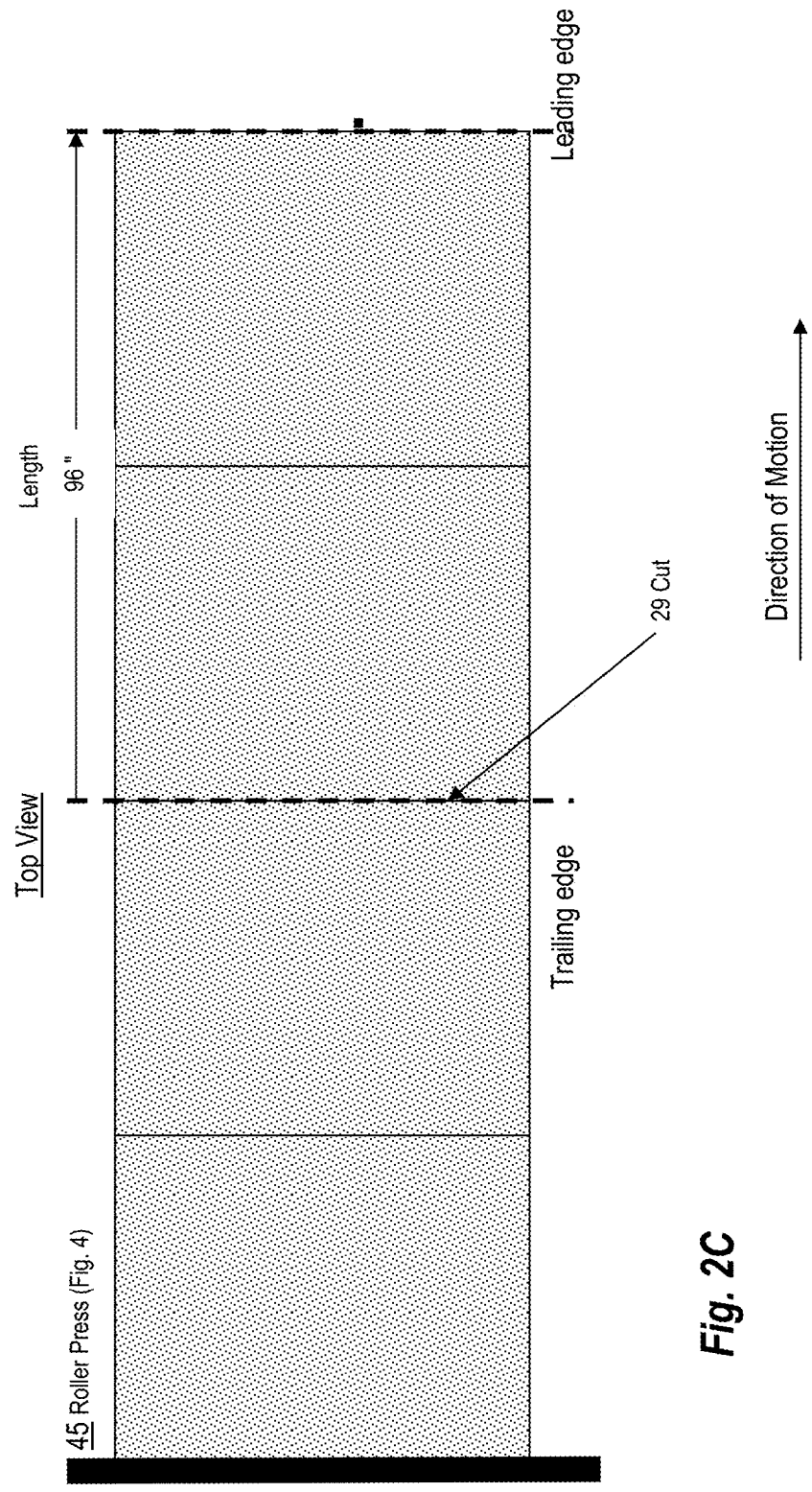
FIG. 2C depicts the example laminated product for use in a vehicle deck floor from another top view, according to an embodiment of the present invention.

FIG. 2C depicts the example laminated product for use in a vehicle deck floor from another top view, according to an embodiment of the present invention. The substrate material 11 (11A and 11B) may comprise a wood veneer based material, such as a plywood of from two (2) to eleven (11)

veneer plies or a single strong veneer of some compositions and/or thicknesses and having dimensions of four feet by 8 feet (4×8 ft) or 4×9 ft. Additionally, alternatively or optionally, the substrate material may comprise a fiberglass based material and/or a fiberboard based material. The fiberboard based material may comprise a high density fiberboard and/or a medium density fiberboard. The laminate material may comprise a linerboard material, a paper material, a plastic material such as a vinyl, and/or a composite material. FIG. 2C depicts the top view of the product with the upper laminate layer 12 removed to show the core components 11A-11D, etc. and the seams 21.

The adhesive component is disposed between a surface of the first side of the substrate components 11 and the laminate component 12, in which the laminate component and the substrate component are affixed together with the adhesive component. An example embodiment may be implemented, in which the adhesive component comprises polyvinyl acetate.

An example embodiment may be implemented, in which the substrate component has a lateral dimension of 70 inches to 102 inches, in which the substrate component has a thickness dimension of 2.3 to 19 millimeters, and/or in which the laminate component has a thickness of #33 ply to #90 ply (all inclusively).

Example Manufacturing System

Example embodiments of the present invention relate to a process and a system for manufacturing the product. An example process comprises arraying a linear sequence of each of the plurality of planar substrate components wherein, in a direction of a movement of the linear sequence parallel to each of a pair of opposite longitudinal edges, a trailing lateral edge of a first of the planar substrate components abuts a leading edge of a second of the planar substrate components. The linear laminate component is fed continuously in a direction and at a speed that matches the movement of the linear sequence of substrate components. The linear laminate component has a thickness between a first side and a second side opposite from the first side thereof and a width between two parallel longitudinal edges thereof. The adhesive component is applied continuously to the first side of each of the substrate components in the linear sequence thereof and/or to the second side of the linear laminate component.

The first side of each of the substrate components is attached to the second side of the linear laminate component to form an intermediate assembly. The intermediate assembly has a first surface comprising the first surface of each of the substrate components thereof and a second surface opposite from the first surface. The intermediate assembly second surface comprises the second surface of the linear laminate component. The first surface and the second surface of the intermediate assembly are mechanically compressed. During the mechanical compression thereof, the first surface and the second surface of the intermediate assembly are heated at the same time. Upon the simultaneous mechanical compression and heating, the substrate component and the laminate component are securely affixed to each other to form the product. In an example embodiment, the product is cut to form a plurality of portions of the product. In an example embodiment, a manufacturing system performs the process for producing the product.

Figure 3:
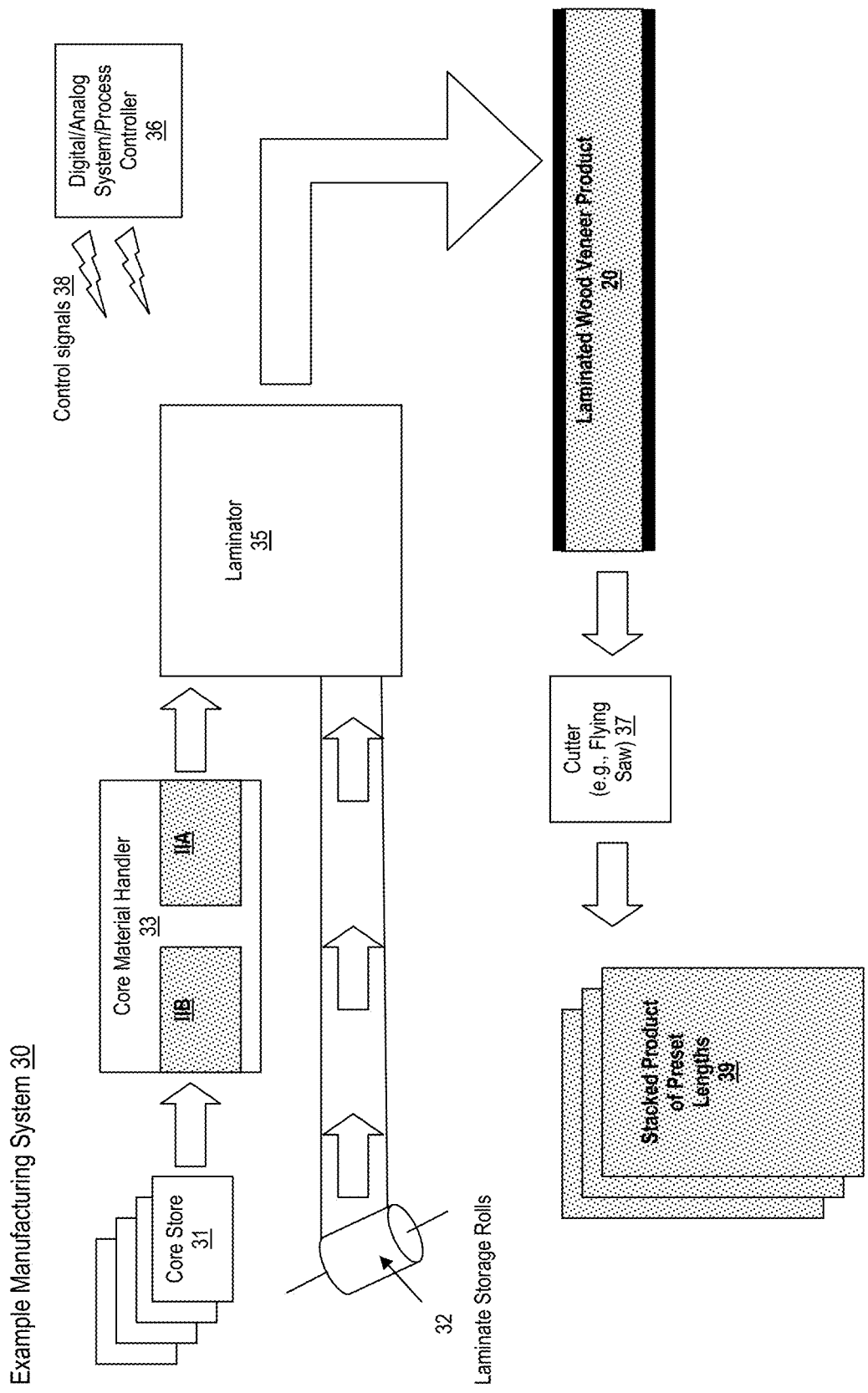
FIG. 3 depicts an example system for manufacturing a product for use in a vehicle deck floor, according to an embodiment of the present invention.

FIG. 3 depicts an example system 30 for manufacturing a product for use in a vehicle deck floor, according to an embodiment of the present invention. The components of manufacturing system 30 may be disposed or arranged about a facility such as a factory in such a way as to facilitate efficient and cost-effective production.

System 30 and/or one or more of its components may be controlled by a digital, analog or mixed analog-digital controller 36. The controller 36 generates process control signals 38, which may be transmitted to the controllable components of system 30 by a wireless-based and/or wireline-based electrical or optical transmission medium and/or pneumatic and/or hydraulic tubing or the like. The controller 36 may be operable with a computer, microcontroller, relays, sensors and various electrical, electronic, pneumatic, pneumatic-hydraulic or other process control systems.

System 30 has a first material handler component 33, which is operable for arraying a linear sequence of each of a plurality of planar substrate core precursors (e.g., material 10, FIG. 1) in a storage magazine, hopper, bin or feeder 31 thereof. In a direction of a movement of the linear sequence (e.g., towards laminator 35), a trailing lateral edge of a first of the planar substrate core precursors (e.g., core 11A; FIG. 2A, 2B) abuts a leading trailing edge of a second of the planar substrate core precursors (e.g., core 11B; FIG. 2A, 2B).

Figure 4A:
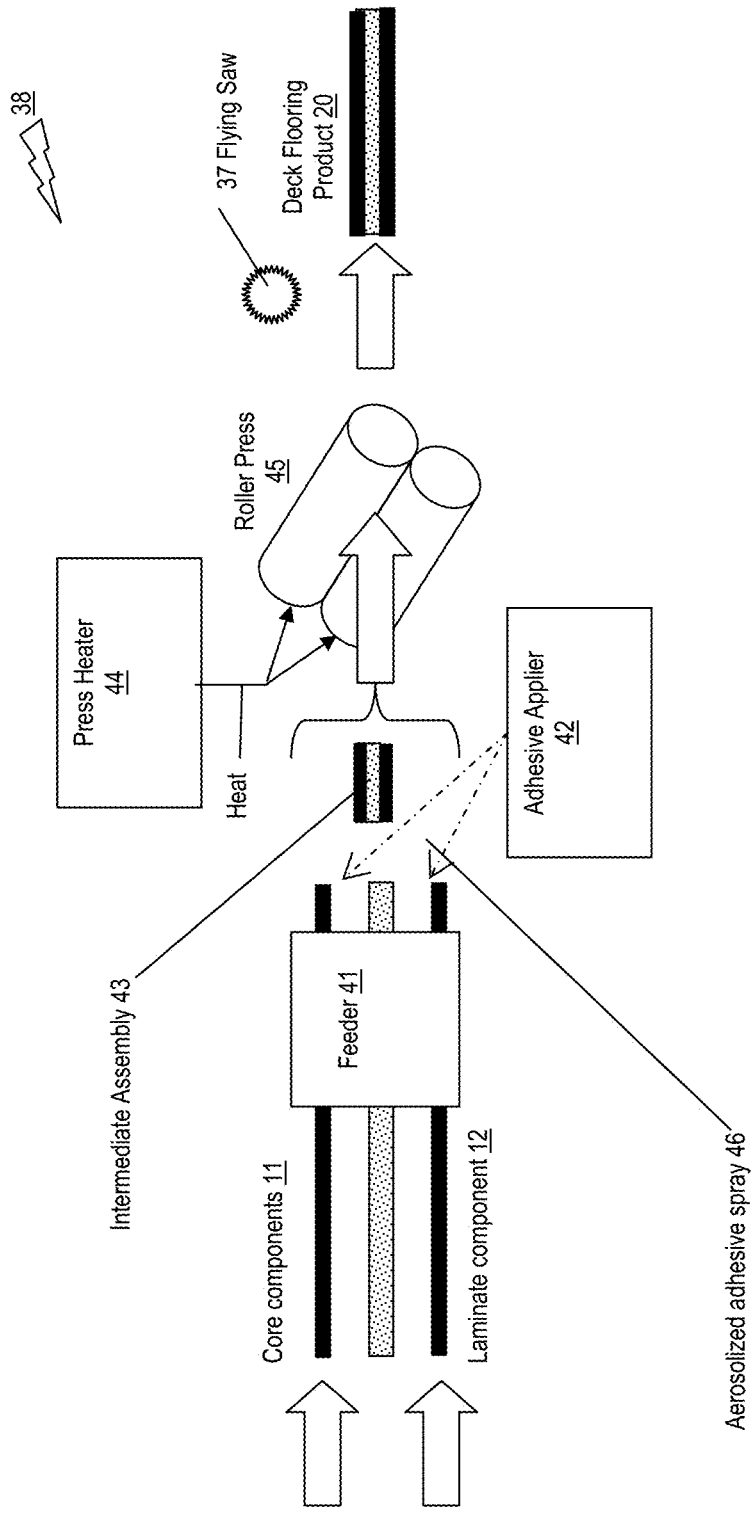
FIG. 4A depicts an example laminator component, according to an embodiment of the present invention.
Figure 4B:
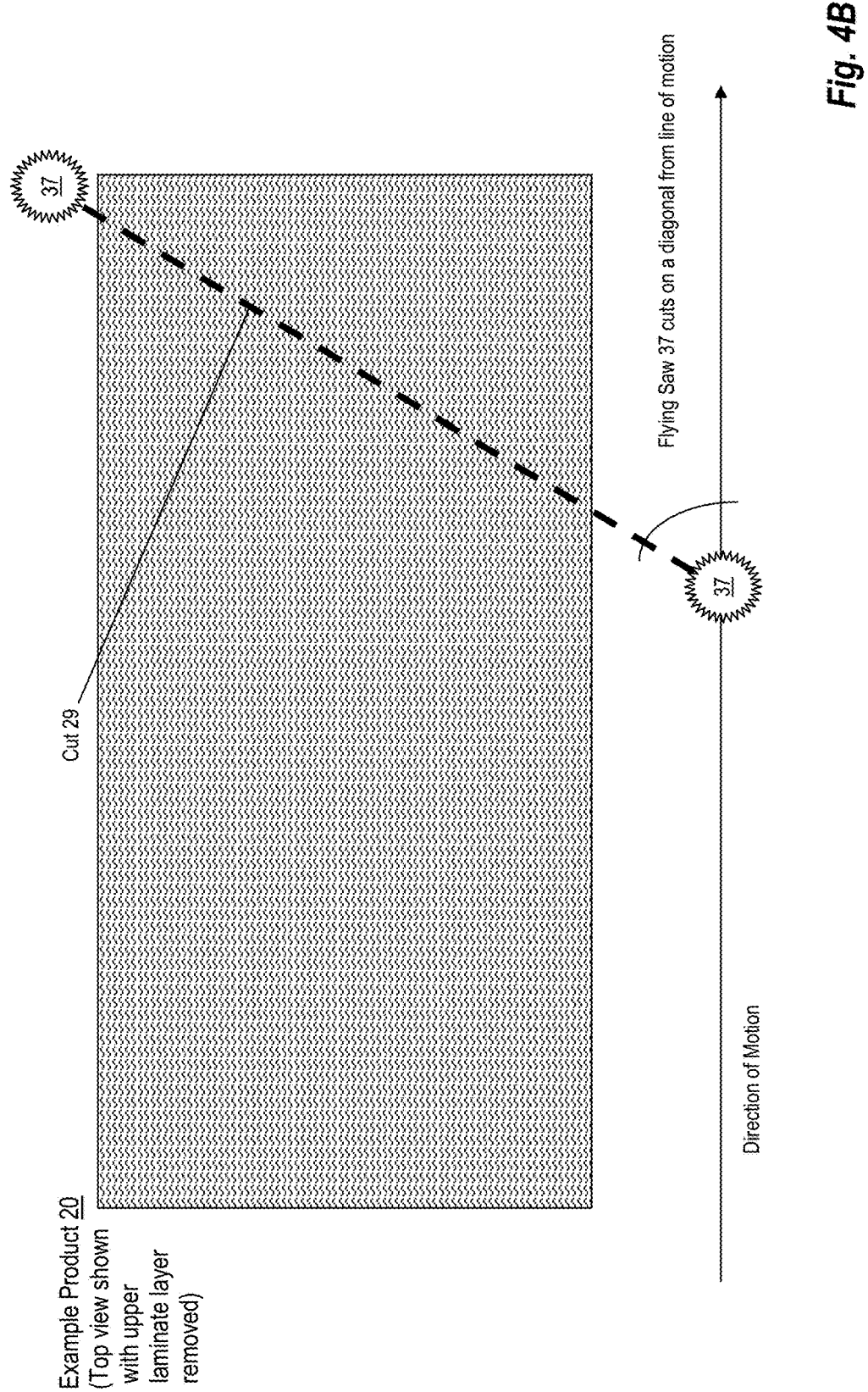
FIG. 4B depicts an example laminated product for use in a vehicle deck floor as cut from a top view, according to an embodiment of the present invention.
Figure 4C:
FIG. 4C depicts example laminate storage, according to an embodiment of the present invention.
Figure 4D:
FIG. 4D depicts example core substrate storage and handler, according to an embodiment of the present invention.

FIG. 4C depicts example laminate storage 32, according to an embodiment of the present invention. FIG. 4D depicts example core substrate storage 31 and handler 33, according to an embodiment of the present invention.

System 30 also has a second material handler component 32 operable for feeding a linear laminate precursor continuously in a direction and at a speed, which each match the movement of the linear sequence of substrate precursors, which has a thickness between a first side and a second side opposite from the first side thereof and a width between two parallel longitudinal edges thereof. The second material handler 32 may comprise rolls of stored laminate material, which may be held in a rack supportive of an axle through a longitudinal axis of the laminate rolls and a tractor mechanism for pulling the laminate off the rolls in a continuing web or band feed.

Figure 4E:
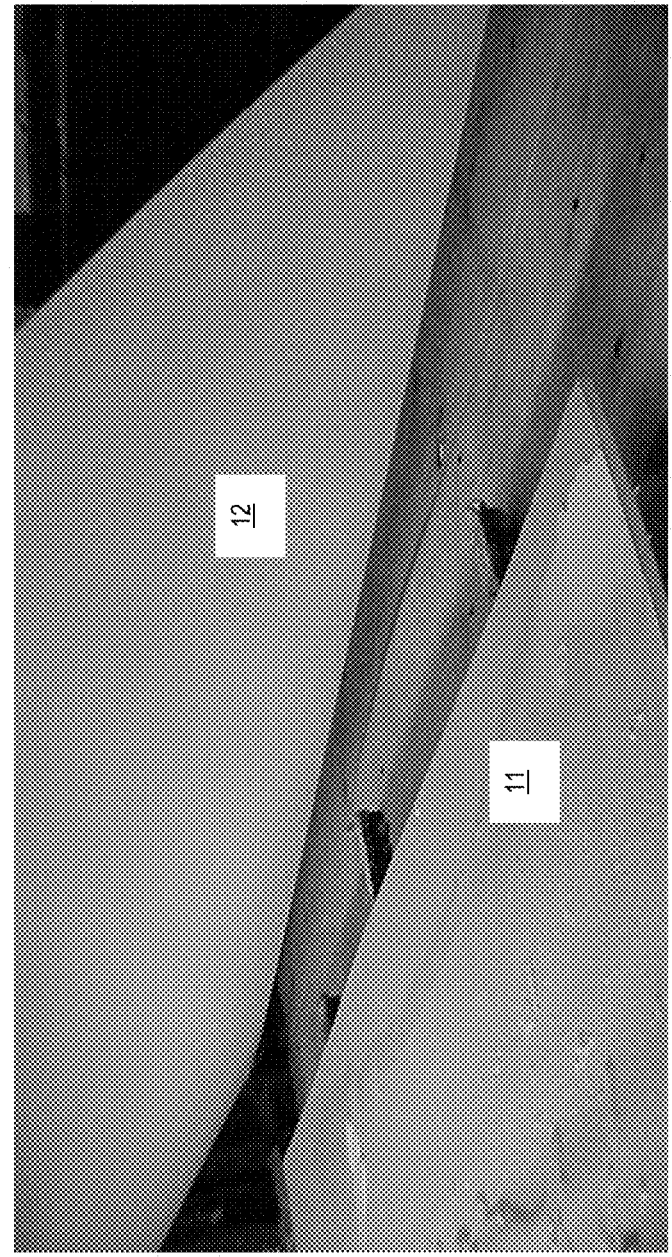
FIG. 4E depicts example laminate and core components just prior to lamination, according to an embodiment of the present invention.

The linear sequence of substrate 11 cores and the continuous laminate precursor feed are drawn or fed into a laminator component (laminator) 35, which and is described in more detail below with reference to FIG. 4A. FIG. 4E depicts example laminate 12 and core 11 components just prior to lamination, according to an embodiment of the present invention. The laminator 35 is operable for applying an adhesive component 46 (FIG. 4A) continuously to the first side of each of the sequence of substrate components 11 and the second side of the linear laminate component 12 and for attaching the first side of each of the substrate components 11 to the second side of the laminate component 12 to form an intermediate assembly 43 (FIG. 4A).

The intermediate assembly 43 has a pair of opposite (e.g., upper and lower) outer surfaces comprising the outer surface of of each of the laminate components 12. Upon forming the intermediate assembly 43, the laminator component 35 is further operable for mechanically compressing the outer surfaces of the intermediate assembly and for heating the outer surfaces of the intermediate assembly during the mechanical compression.

Upon the simultaneous mechanical compressing and heating in the laminator component 35, the substrate component and the laminate component are securely affixed to each other to form the laminated deck flooring product.

FIG. 4A depicts an example laminator component (laminator) 35, according to an embodiment of the present invention. The laminator component (laminator) 35 comprises a sub-system of manufacturing system. Thus, components of the laminator 35 may each comprise sub-components of the manufacturing system 30 and may be disposed or arranged about the facility thereof in such a way as to facilitate efficient and cost-effective production. The laminator 35 and/or one or more of its components may be controlled by the control signals 38.

The laminator 35 comprises a feeder sub-component (feeder) 41, which may include the mechanism for applying traction to each of the pair of the laminate components 12 and feeding the laminate components 12 into the laminator 35. The feeder 41 also feeds the linear substrate core 11 sequence into the laminator 35.

Further, the feeder 41 is operable for feeding the continuous web of the pair of laminates 12 into the laminator 35 at speed that matches the forward speed with which the linear sequence of substrate 11 cores is fed into the laminator. The feeder 41 places the outer surface of each of the substrate components 11 in proximity with the facing side of each of the linear laminate components 12 of the pair in preparation for forming the intermediate assembly 43.

Upon the surface of each of the substrate components 11 and the facing side of the laminate components 12 being brought into proximity with each other, an adhesive applier sub-component (adhesive applier) 42 applies adhesive component 46 continuously to at least the surface of each of the substrate components 11, and/or to the facing sides of each of the laminate components 12 of the pair to form the intermediate assembly 43.

An example embodiment may be implemented in which the adhesive applier 42 is disposed in a spray booth of the manufacturing facility, which may confine, filter and collect a portion of the adhesive component. The spray booth may thus prevent, deter or minimize an exposure of the facility atmosphere, workers and others, and the environment to the adhesive and its propellant and any diluting gases or fluids.

The adhesive applier 42 is operable for aerosolizing an adhesive compound such as polyvinyl acetate and propelling the aerosolized adhesive component 46 as a spray, which is directed continuously to evenly cover the entire surfaces of the sequence of substrate components 11 and/or the facing sides of the linear laminate components 12 of the pair.

Upon the even application of the adhesive component 46 thereon, the laminator 35 is operable for attaching the surface of each of the substrate components 11 to the facing sides of the linear laminate component 12 to form the intermediate assembly 43. The intermediate assembly 43 has opposite outer surfaces comprising the outer surface of each of the laminate components 12.

Figure 4F:
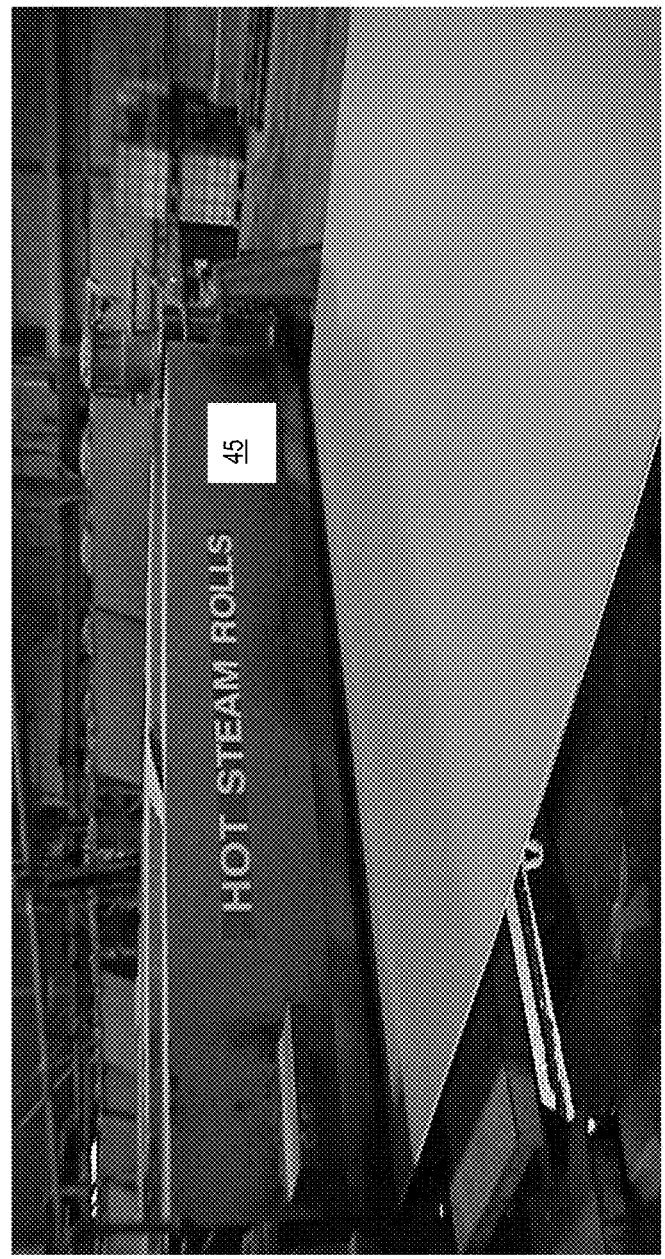
FIG. 4F depicts an example heated roller press, according to an embodiment of the present invention.

The movement of the intermediate assembly 43 through the laminator 35 is based on (and may even proceed apace with) the speed of the movement of the precursor components 11 and 12 through the system 30. The laminator 35 has a press heater sub-component (heater) 44 and a roller press sub-component (roller press) 45, which are operable together over the moving intermediate assembly 43. FIG. 4F depicts an example heated roller press 45, according to an embodiment of the present invention.

As the moving intermediate assembly 43 moves through the laminator 35, it is fed into the roller press 45 and proceeds through, between each of the rollers. The roller press 45 is operable for mechanically compressing the outer surfaces of the intermediate assembly 43 together. An example embodiment may be implemented in which the rollers are impelled towards each other with a hydraulic, spring-based and/or impulse-driven force. The roller surfaces transfer this force mechanically to the outer surfaces of the intermediate assembly 43 and thus press its surfaces together.

The heater 44 is operable for heating the first surface and the second surface of the intermediate assembly 43 during the mechanically compressing. Upon the simultaneous mechanical compression and the application of heat, the substrate component and the laminate components are securely affixed to each other to form the deck flooring product 20.

An example embodiment may be implemented in which the heater 44 heats the surface of each roller of the roller press 45 with pressurized steam (or electrically) to a temperature of 350 to 400 degrees Fahrenheit. The roller surfaces thus heat the outer surfaces of the intermediate assembly 43 to this temperature as it moves through the compressively operational roller press 45.

In an example embodiment of the present invention, the combined application adhesive and the simultaneous heating and compressing in the laminator 35 bonds the laminate component 12 to the substrate core component 11 securely, and essentially permanently, to form the deck flooring product 20. In an example embodiment of the present invention, the product 20 may be cut (e.g., with a saw) as it emerges from the laminator 35.

Figure 4G:
FIG. 4G depicts an example flying saw, according to an embodiment of the present invention.

With reference again to FIG. 3, an example embodiment may be implemented in which the product is cut with a flying saw 37 as it emerges from the laminator 35. The product 20 moves with the speed that is based on the movement speed of the linear substrate sequence into the laminator 35. The cutting of the product 20 may comprise striking a cut parallel to the lateral axis of the product 20. FIG. 4G depicts an example flying saw 37, according to an embodiment of the present invention.

In an example embodiment of the present invention, the striking of the cuts parallel to the lateral axis of the product 20 is performed independent of the position of any of the seams 21. In relation to any and all of the seams 21, the striking of the cuts is essentially random and the product portions may thus be cut to any desired longitudinal lengths.

FIG. 4B depicts the example laminated product 20 as cut from a top view, according to an embodiment of the present invention. To strike the cut parallel to the lateral axis, the flying saw 37 moves a cutter blade across the product from a first longitudinal edge to a second longitudinal edge thereof diagonally, e.g., at an angle and with a speed along a ray of the angle diagonal to the longitudinal edges, in which the angle is based on the movement speed of the product 20. The separated portions 39 of the cut product 20 (e.g., each of a preset length) may then be stacked and/or handled further. System 30 is operable for performing a manufacturing process.

Example Manufacturing Process

Figure 5:
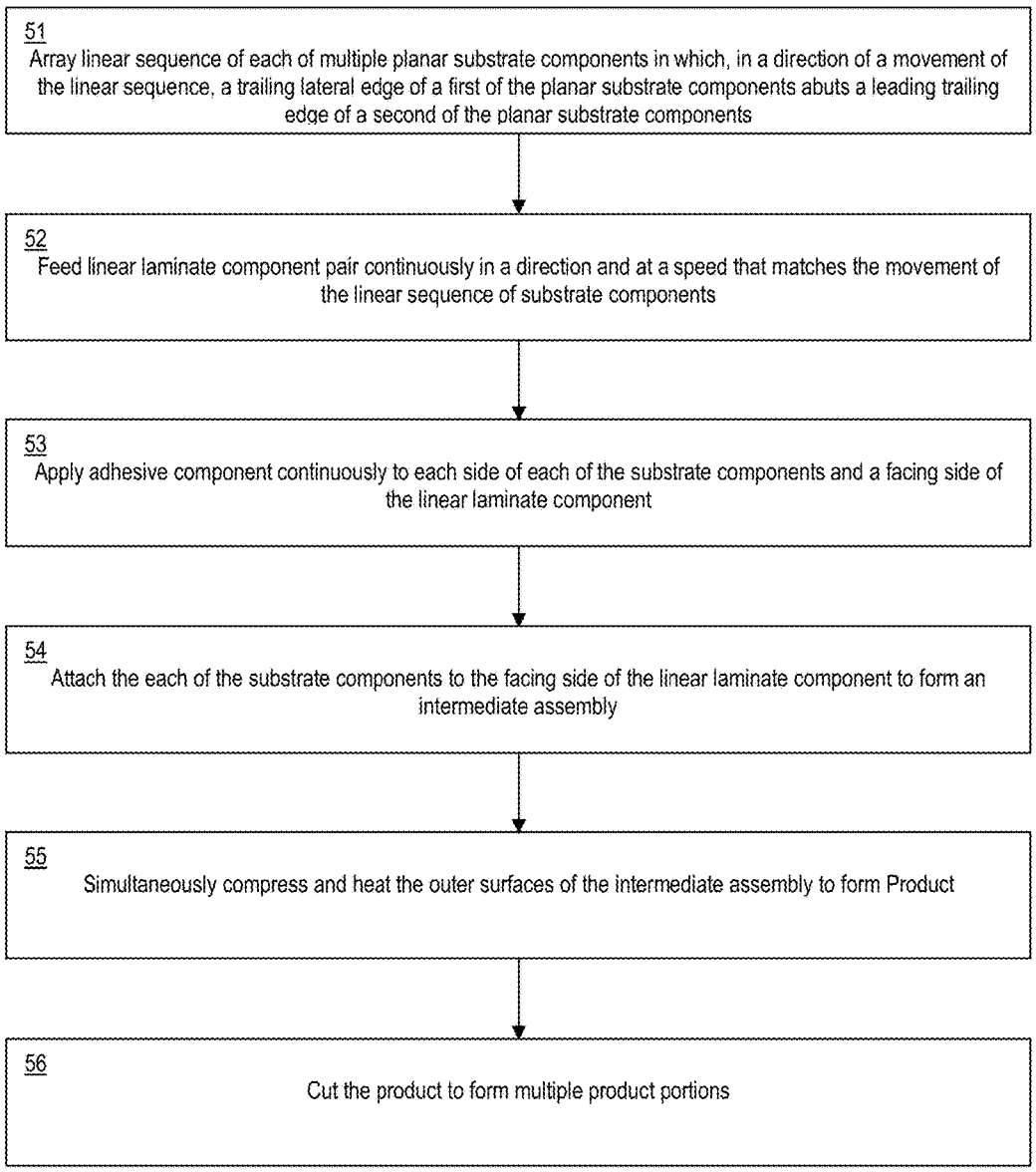
FIG. 5 depicts a flowchart for an example process for manufacturing a product for use in a vehicle deck floor, according to an embodiment of the present invention.

FIG. 5 depicts a flowchart for an example process 50 for manufacturing a product for use in a vehicle deck floor, according to an embodiment of the present invention. The process 50 may be performed by the example system 30, described above.

In step 51, a linear sequence of each of a plurality of (multiple) planar substrate components is arrayed. The linear sequence is arrayed in a direction of a movement of the linear sequence parallel to each of a pair of opposite longitudinal edges. A trailing lateral edge of a first of the planar substrate components abuts a leading edge of a second of the planar substrate components.

In step 52, a pair of linear laminate components is fed continuously in a direction and at a speed that matches the movement of the linear sequence of substrate components wherein the linear laminate component has a thickness between a first side and a second side opposite from the first side thereof and a width between two parallel longitudinal edges thereof.

In step 53, an adhesive component is applied continuously to each side of each of the substrate components and/or a side of each of the linear laminate components of the pair facing the substrate components.

In step 54, the first side of each of the substrate components is attached to the second side of the linear laminate component to form an intermediate assembly. An outer surface of the intermediate assemble comprises the outer surfaces of each of the laminate components.

In step 55, the outer surfaces of the intermediate assembly are compressed mechanically while simultaneously during the mechanical compression, the outer surfaces of the intermediate assembly are heated. Upon the mechanically compressing and the heating, the substrate component and the laminate components are securely affixed to each other, essentially permanently, to form the product.

In step 56, the product is cut to form a multiple portions of the product, which may be stacked and/or further handled. The lengths of the product portions may be pre-set, selected, controlled, changed and/or adjusted based on control exerted over cutting speeds and angles in relation to speed of the moving precursors and/or intermediate assemblies from which they are cut.

The product may be cut to a length that accommodate the overall length of an RV, trailer or MHU. Additionally or alternatively, the product may cut down the middle, or otherwise parallel to a longitudinal axis. For example, two 4' by 10-15' products may thus be cut from a single piece of 8' by 10-15' precursors.

The product portion dimensions may be varied or optimized for use in various further manufacturing endeavors, as may fit a particular application, purpose or order. For example, the product portion dimensions may be cut to a specification for use in the manufacture of various structural assemblies such as recreational vehicles (RVs), trailers and/or manufactured housing units (MHUs).

Example Assemblies

The product produced according to an example embodiment of the present invention may be installed as floor decking in RVs, trailers, MHUs and various other structural assemblies. FIG. 6A depicts an exploded and partially cut-away side view of an example trailer assembly (trailer) 600, according to an embodiment of the present invention. In FIG. 6A, arrows with open points and evenly spaced dashes represent lines of perspective in the exploded view. In FIG. 6A, unevenly spaced dashed lines or circles represent the periphery of far-side components.

The trailer 600 has a steel chassis 601, which provides a solid, strong and durable horizontal foundation for bearing the weight of other components of trailer 600, which are supported therewith. The chassis is supported over a pair of axles 603 by a suspension 602, which may also dampen shock and vibration over the trailer 600 as it moves on wheels 619 at each end of the axles 603. A coupler 659 such as a trailer hitch and yolk rig may be attached securely to a leading lateral edge of the chassis 601 for applying traction thereto, with which the trailer 600 may be towed, moved or shifted.

A floor frame 604 is securely fasted (e.g., bolted) to the chassis 601. A portion 39 of the product 20, which comprises a single piece of material and has been cut to a length to fit the floor frame 604, is affixed thereto to form the deck flooring for the trailer 600. An example embodiment may be implemented in which the second side of the laminate component 12 of the floor 39 is affixed to the floor frame 604 with an adhesive such as glue. A floor covering 614 such as carpet, vinyl, linoleum or the like may then cover the upper surface of the deck 39 (e.g., the exposed second surface of the core component 11).

An end cap and wall frame 606 is installed over each of the leading and trailing edge of the chassis 601. A roof and wall frame 608 is suspended from an upper edge of each of the end caps and wall frames 606. A wall 607 may be supported by the wall frames 606 and 607 (and at a lower edge of the wall). Materials used in the trailer 600 may conform to a fire-rating and to various other standards and codes.

Figure 6B:
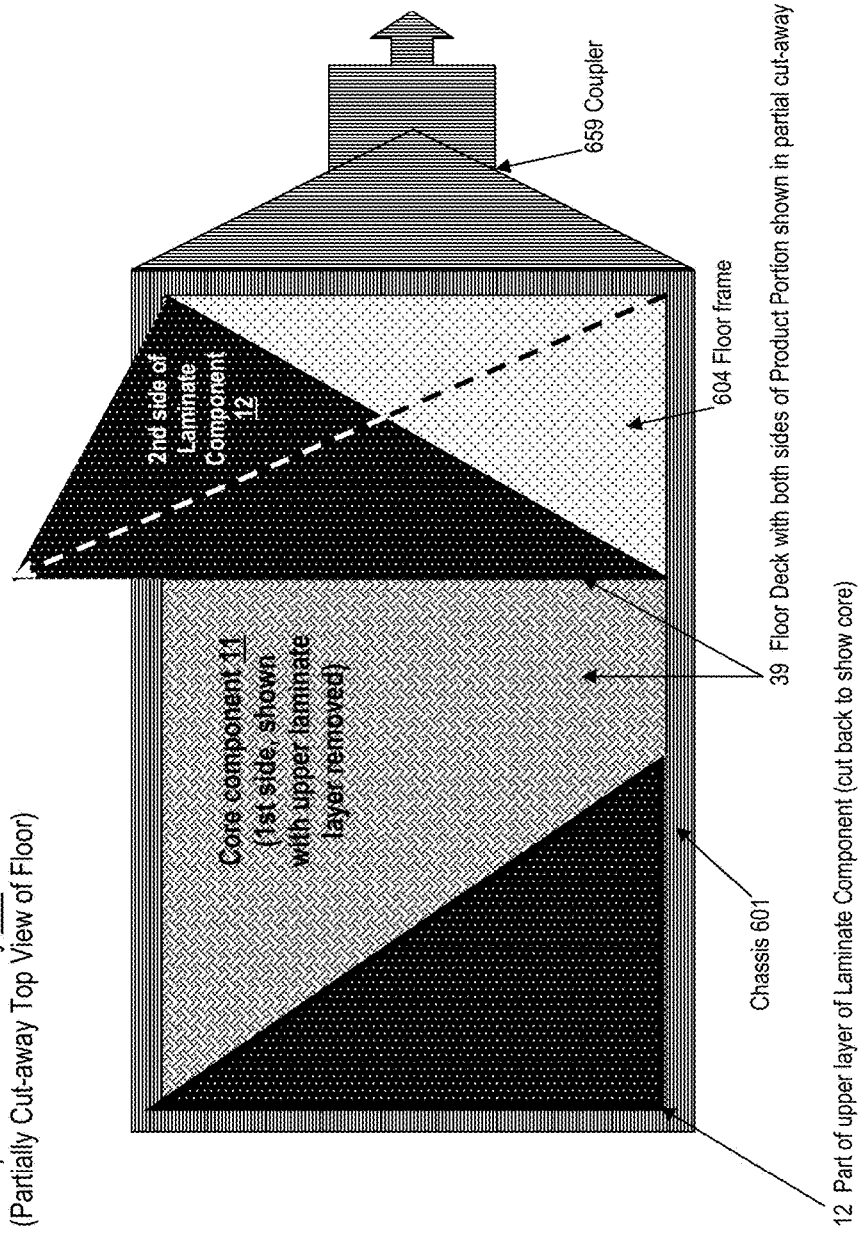
FIG. 6B an exploded and partially cut-away top view of an example floor in the trailer assembly shown in FIG. 6A.

FIG. 6B an exploded and partially cut-away top view of an example floor 39 in the trailer assembly 600 (as shown in FIG. 6A). The upper surface of the deck 39 comprises the first side of the core component 11 thereof. From a perspective in which the coupler 659 is mounted at the leading edge of the chassis 601, FIG. 6B presents a partial cut-away view of the floor 39 as if the forward starboard corner thereof has been lifted off and peeled above of the plane of the floor to reveal the facing side of the lower laminate component 12 and as if a portion of the upper laminate has been peeled off to reveal the core 11.

Figure 6C:
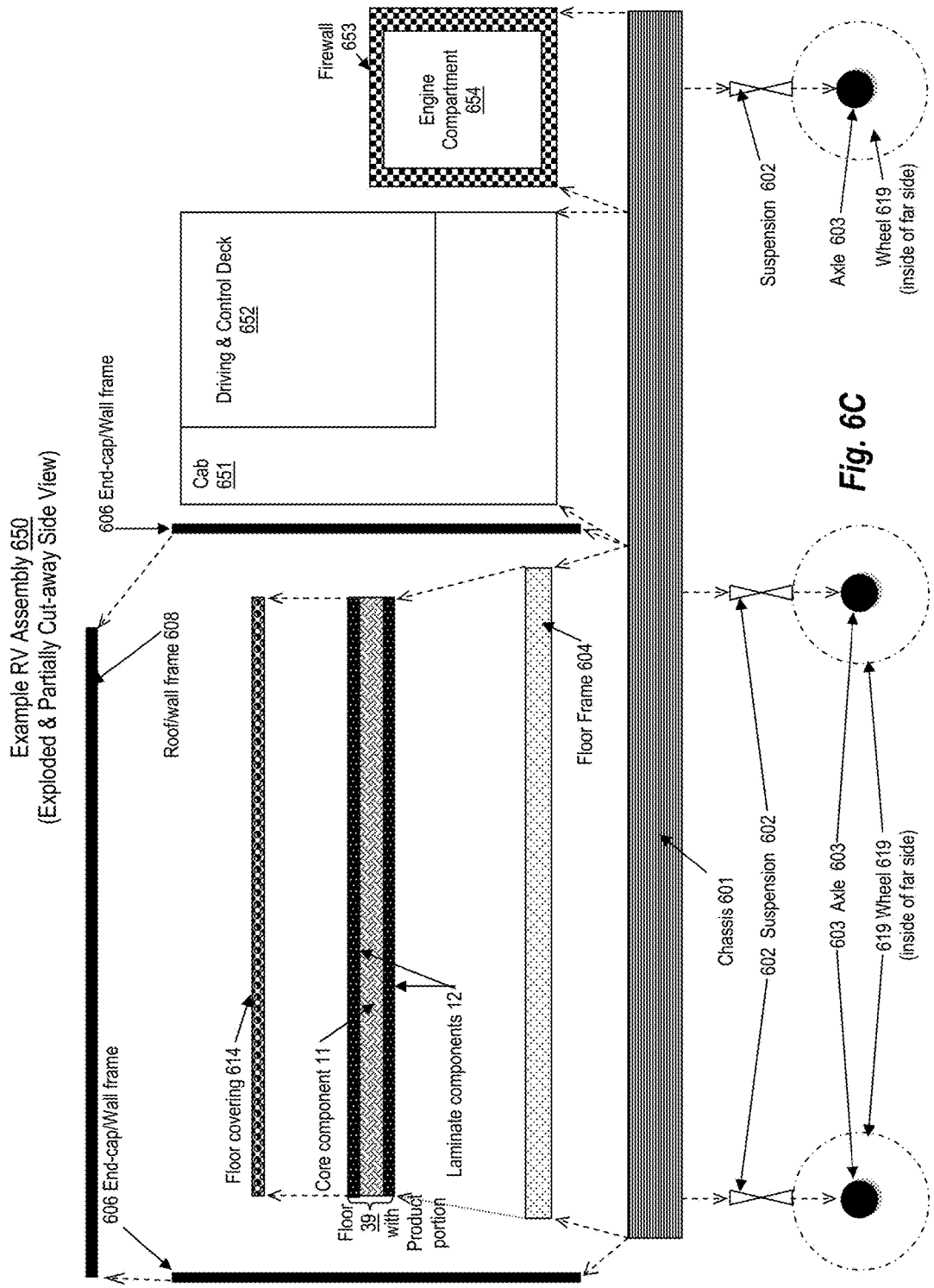
FIG. 6C depicts an exploded and partially cut-away side view of an example RV assembly, according to an embodiment of the present invention.

FIG. 6C depicts an exploded and partially cut-away side view of an example RV assembly (RV) 650, according to an embodiment of the present invention. Like the trailer 600 (FIG. 6A, 6B), the RV 650 has a steel chassis 601, which provides a solid, strong and durable horizontal foundation for bearing the weight of other components of trailer 600, which are supported therewith.

The chassis is supported over at least a pair of axles 603 by a suspension 602, which may also dampen shock and vibration over the RV 650 as it moves on wheels 619 at each end of the axles 603. An engine compartment 654 is disposed within a firewall 653 at a leading lateral edge of the chassis 601.

A driving and control deck 652 is disposed in a cab 651, which may be separated from the leading edge of the chassis 601 by the engine compartment 654, etc. An end cap and wall frame 606 is installed behind the cab 651 and over trailing edge of the chassis 601. A roof and wall frame 608 is suspended from an upper edge of each of the end caps and wall frames 606. Materials used in the RV 650 may conform to a fire-rating and to various other standards and codes.

A floor frame 604 is securely fasted (e.g., bolted) to the chassis 601. A portion 39 of the product 20, which comprises a single piece of material and has been cut to a length to fit the floor frame 604, is affixed thereto to form the deck flooring for the trailer 600. An example embodiment may be implemented in which the second side of the laminate component 12 of the floor 39 is affixed to the floor frame 604 with an adhesive such as glue. A floor covering 614 such as carpet, vinyl, linoleum or the like may then cover the upper surface of the deck 39 (e.g., the exposed second surface of the core component 11).

Figure 6D:
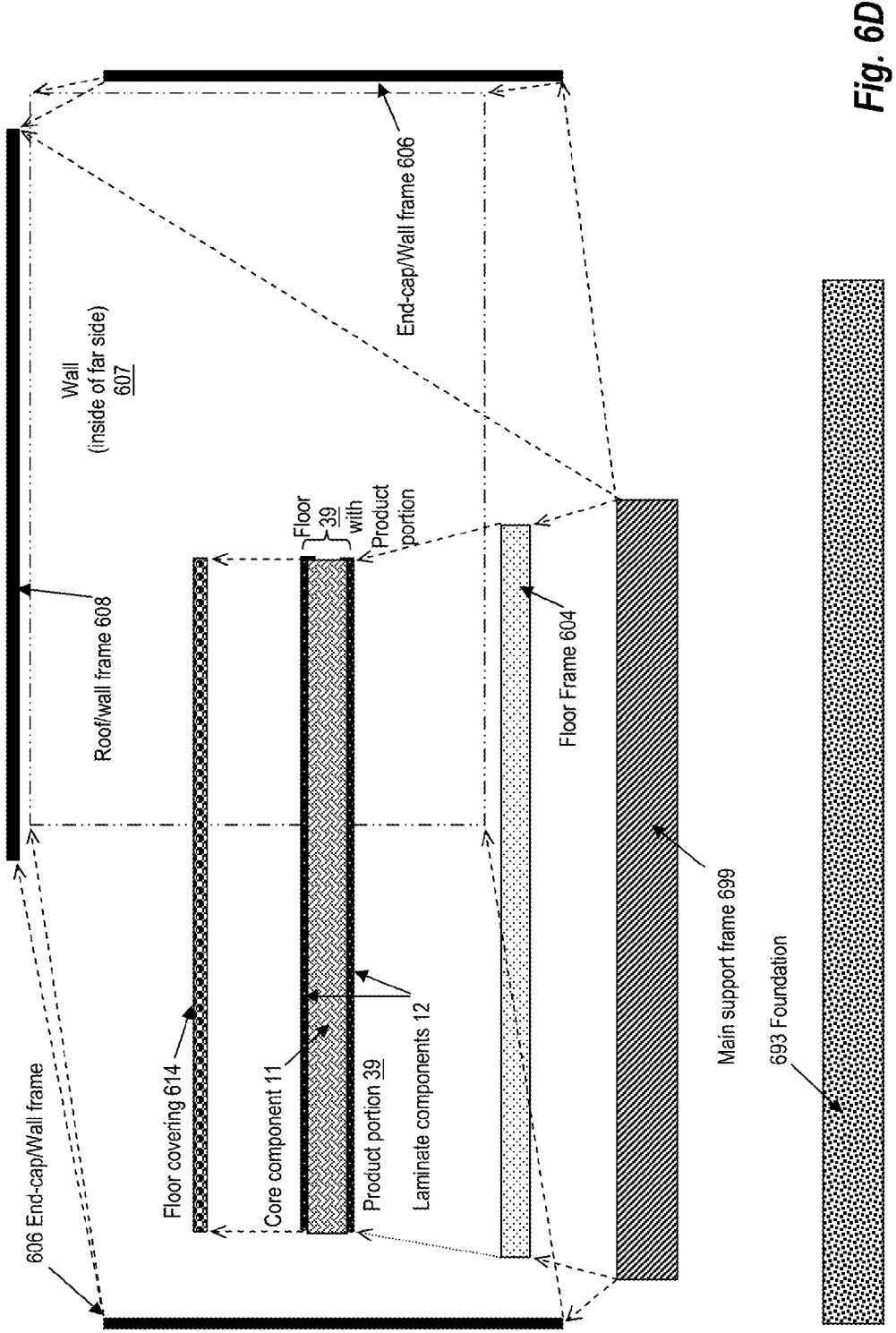
FIG. 6D depicts an exploded and partially cut-away side view of an example MHU assembly, according to an embodiment of the present invention.

FIG. 6D depicts an exploded and partially cut-away side view of an example MHU assembly (MHU) 690, according to an embodiment of the present invention. The MHU 690 has a steel main support frame 699, which provides a solid, strong and durable horizontal foundation for bearing the weight of other components of the MHU 690, which are supported therewith. The main support frame 699 is supported over a foundation 693, such as a concrete slab or the like.

A floor frame 604 is securely fasted (e.g., bolted) to the main support foundation 699. A portion 39 of the product 20, which comprises a single piece of material and has been cut to a length to fit the floor frame 604, is affixed thereto to form the deck flooring for the MHU 690. An example embodiment may be implemented in which the second side of the laminate component 12 of the floor 39 is affixed to the floor frame 604 with an adhesive such as glue. A floor covering 614 such as carpet, vinyl, linoleum or the like may then cover the upper surface of the deck 39 (e.g., the exposed second surface of the core component 11).

An end cap and wall frame 606 is installed over each of the leading and trailing edge of the main support frame 699. A roof and wall frame 608 is suspended from an upper edge of each of the end caps and wall frames 606. A wall 607 may be supported by the wall frames 606 and 607 (and at a lower edge of the wall). Materials used in the MHU 690 may conform to a fire-rating and to various other standards and codes.

Example embodiments thus relate to RV, trailer and MHU assemblies, which may be manufactured using the single piece product. Used with flooring installed in RVs, trailers and MHUs, an example embodiment of the present invention thus reduces assembly and manufacturing costs, labor and time and is operable to bear loads that may shift from one position on a floor to another without significant vertical displacement. This feature is achieved independent and irrespective of where on the floor the load may begin shifting, and where a given shifting may end in relation to any of the seams 21 between core precursor components 11.

Floors Shown with Shifting Loads

Figure 8A:
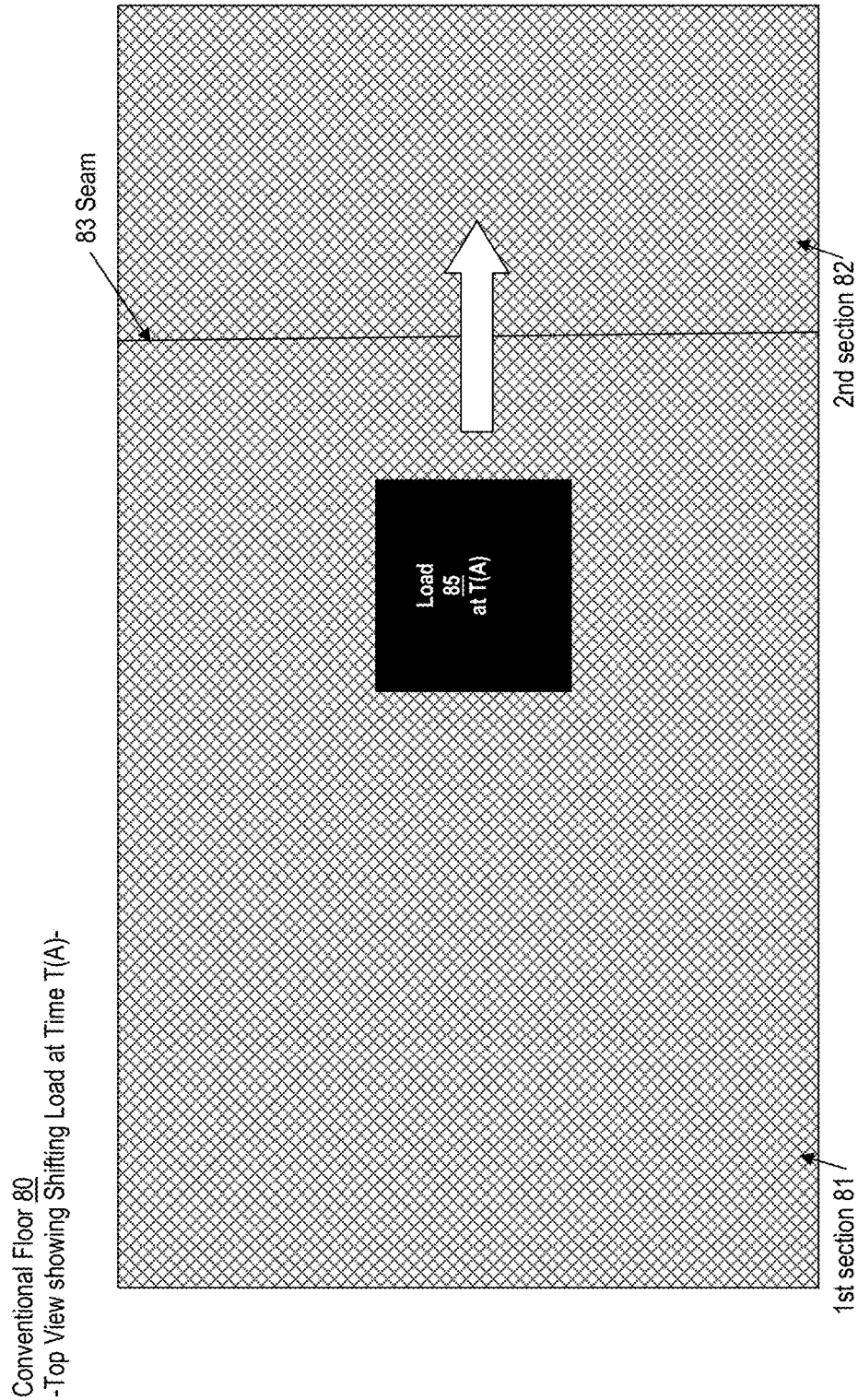
FIG. 8A depicts a top view of a conventional floor with the shifting load at the first time.
Figure 8B:
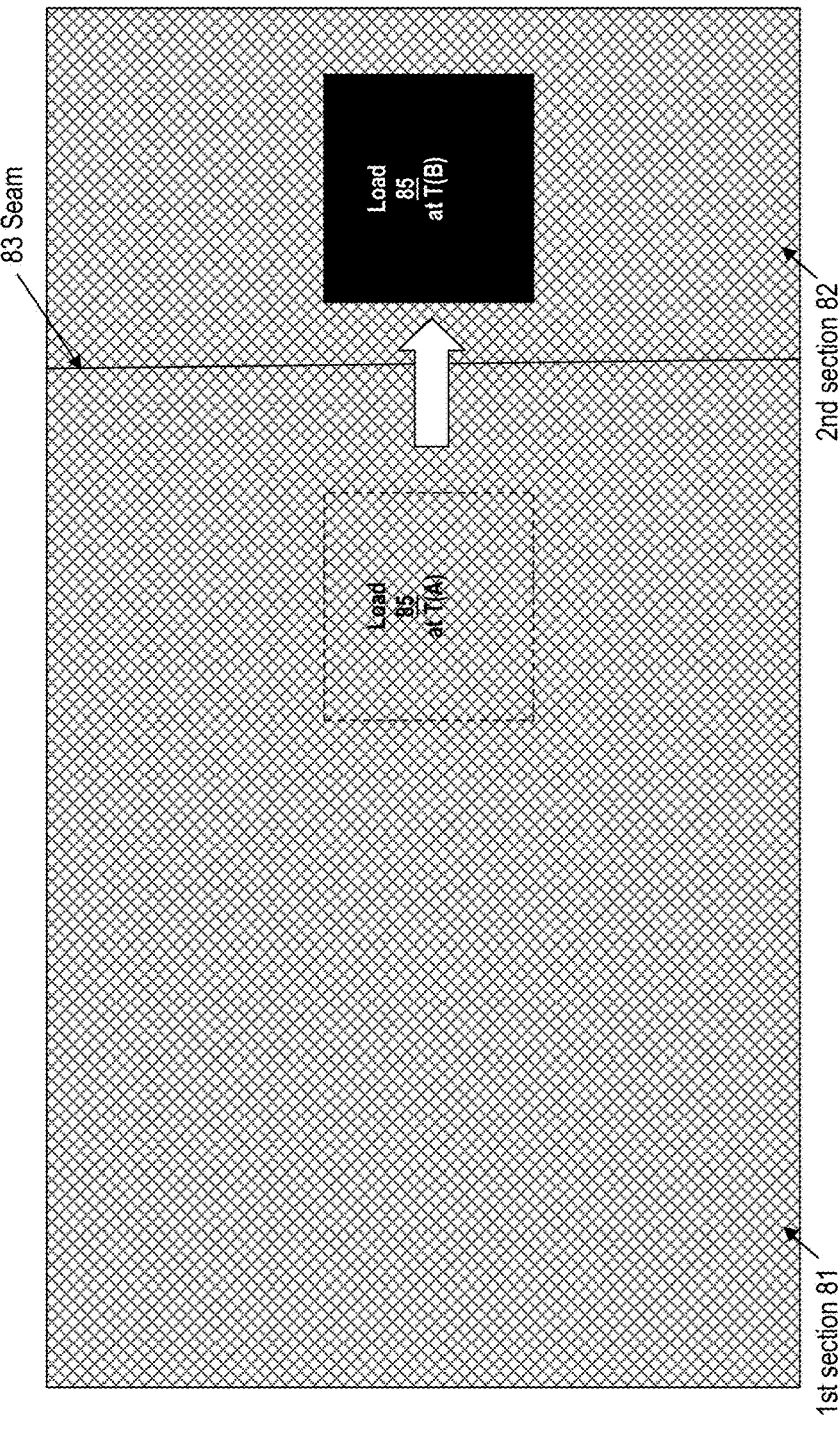
FIG. 8B depicts a top view of the conventional floor with the shifting load (as shown in FIG. 8A) at a second time.

An example embodiment of the present invention is operable to bear loads that may shift from one position on a floor to another without significant vertical displacement. This feature is achieved independent and irrespective of where on the floor the load may begin shifting, and where a given shifting may end in relation to any of the seams 21. In contrast, conventional floors are constructed using typical deck materials such as a non-laminated wood veneer or fiberglass, plywood, or the like For example, FIG. 8A (prior art) depicts a top view of a conventional floor 80 with a shifting load 85 at a first time T(A). FIG. 8B (prior art) depicts a top view of the conventional floor 80 with the shifting load (as shown in FIG. 8A) at a second time T(B).

The first time T(A) occurs prior to the second time T(B). The first deck section 81 and the second deck section 82 are adjacent to each other. A seam 83 exists where an edge of the first section 81 abuts the adjacent edge of the second section 82.

At the first time T(A), the load 85 is positioned over the first section 81. At the second time T(B), the load 85 has shifted over the seam 83 to occupy a second position over the second section 82. FIG. 8C (prior art) depicts a side view of a conventional floor with a shifting load at the first time (as shown in FIG. 8A). In the position it occupies at the first time T(A), the load 85 exerts a downward force on the first deck section 81, relative to the second section 82, which is unloaded at that instant.

The downward force exerted by the load 85 at the first time T(A) may cause localized horizontal displacement of the first section downward in relation to the second section 82 along the seam 83. FIG. 8D (prior art) depicts a side view of the conventional floor with the shifting load (shown in FIG. 8C) at the second time T(B). In the position it occupies at second time T(B), the load 85 exerts a downward force on the second deck section 82 in relation to the first section 81, which is now unloaded.

The downward force exerted by the load 85 at the second time T(B) may now cause localized horizontal displacement of the second section 82 downward in relation to the first section 81 along the seam 83, essentially reversing direction in relation to the earlier downward displacement of the first section 81. Unfortunately, the degree of localized displacement and/or the changing directions thereof as loads shift over the seam 83 may be significantly sufficient to be perceivable by users of the floor.

Example Floors Shown with Shifting Loads

An example embodiment of the present invention relates to deck flooring that is resistant to localized displacements from loads shifting across the floor 20 relative to a seam 21 between adjacent portions of its core components 11. The floor 20 is strengthened by the laminating component 12 attached to core components 11.

Thus, the floor 20 is operable for bearing loads that shift from one position on the floor to another without significant vertical displacement resulting. Moreover, this feature is independent and irrespective of where on the floor 20 the load 70 may begin shifting, and where a given shifting may end in relation to any of the seams 21.

Figure 7A:
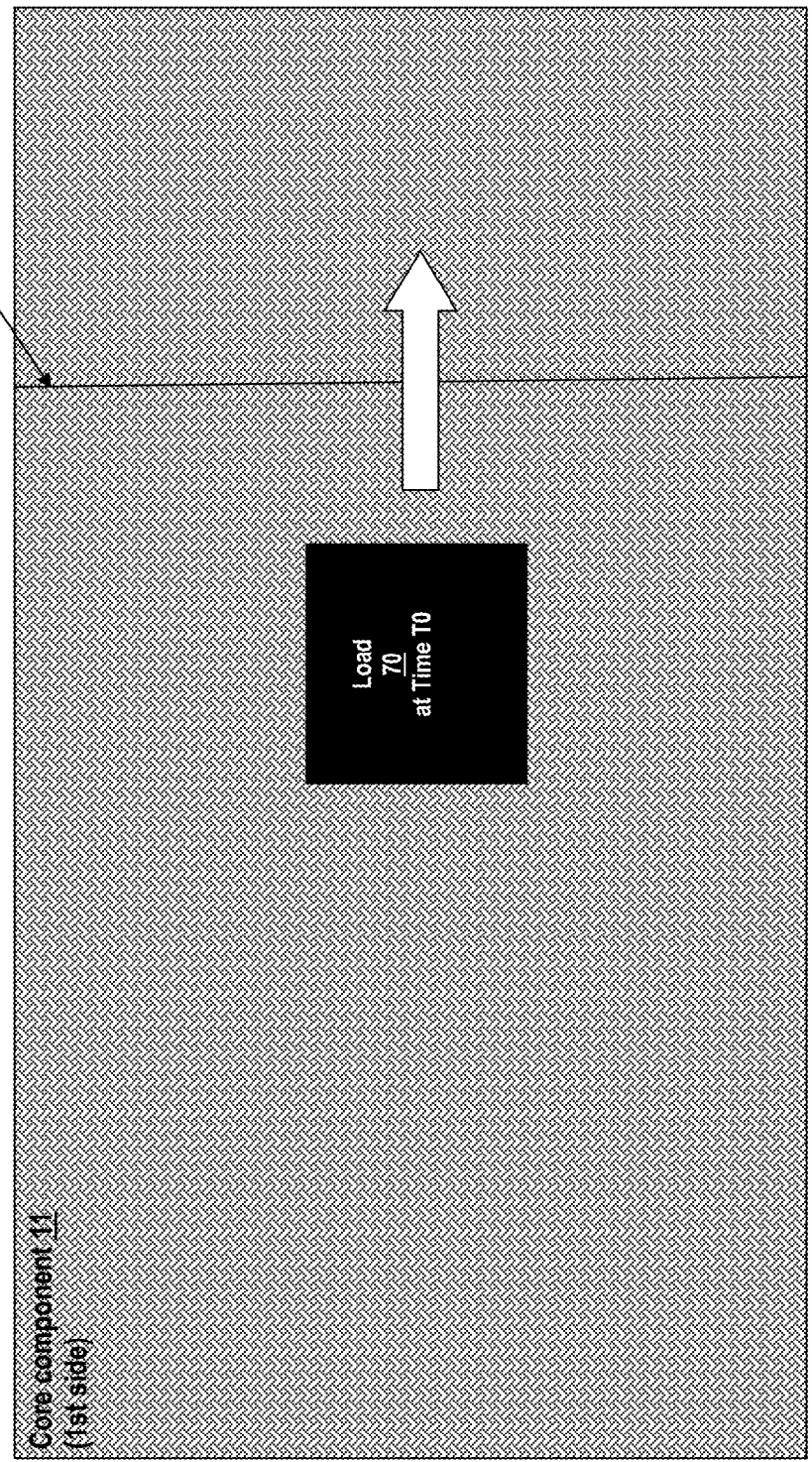
FIG. 7A depicts a top view of an example floor with a shifting load at a first time, according to an embodiment of the present invention.
Figure 7B:
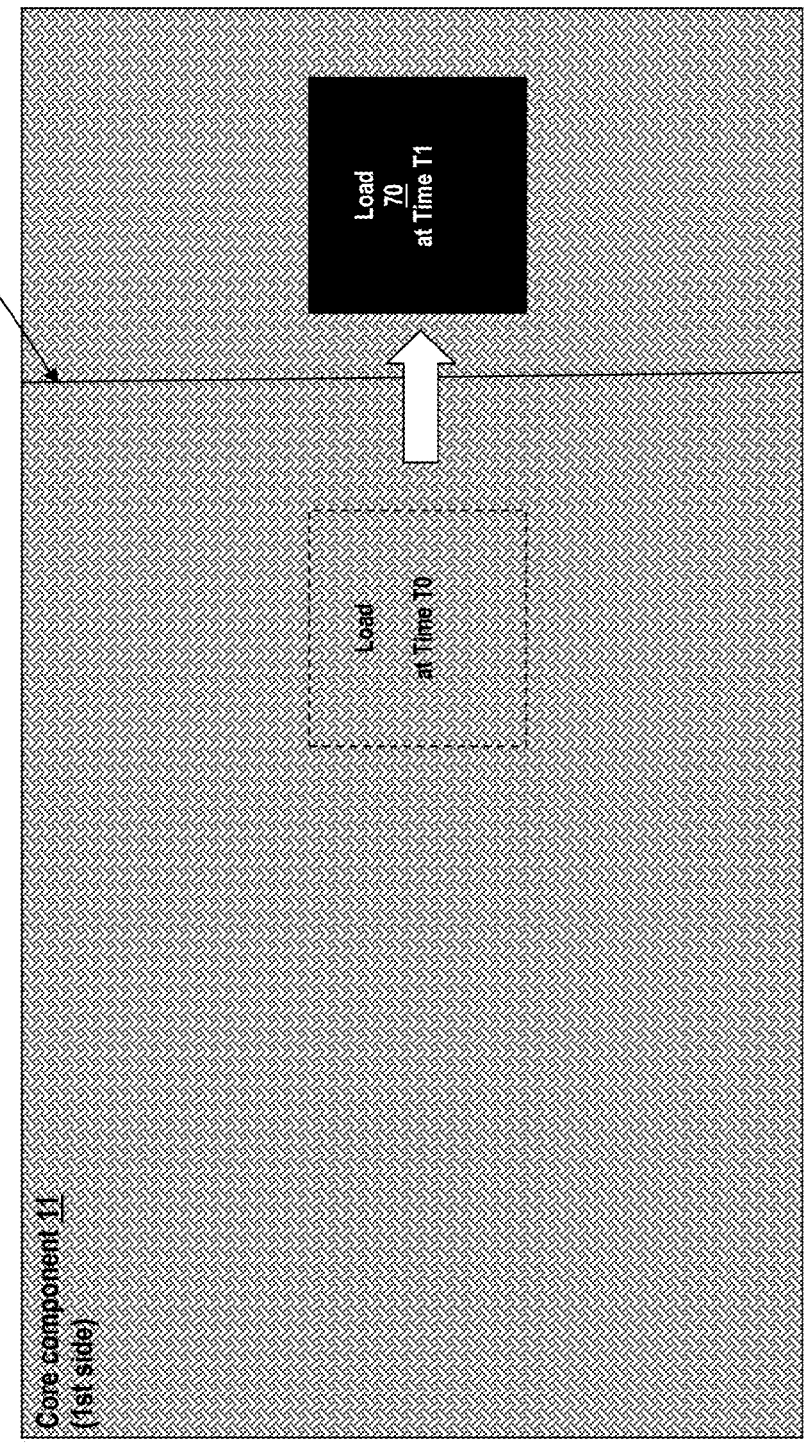
FIG. 7B depicts a top view of the example floor with the shifting load (shown in FIG. 7A) at a second time, according to an embodiment of the present invention.

FIG. 7A depicts a top view of an example floor 20 with a shifting load 70 at a first time T0, according to an embodiment of the present invention. At the first time T0, the load 70 occupies a first position on the upper horizontal surface relative to the seam 21. FIG. 7B depicts a top view of the example floor 20 with the shifting load 70 (shown in FIG. 7A) at a second time T1, according to an embodiment of the present invention. The first time T0 occurs prior to the second time T1. At the second time T1, the load 70 has shifted over the horizontal surface of the floor 20 in relation to the seam 21. FIG. 7A and FIG. 7B show a top view of the example floor 20 with the upper laminate layer removed to show the core 11 and seam 21.

Figure 7C:
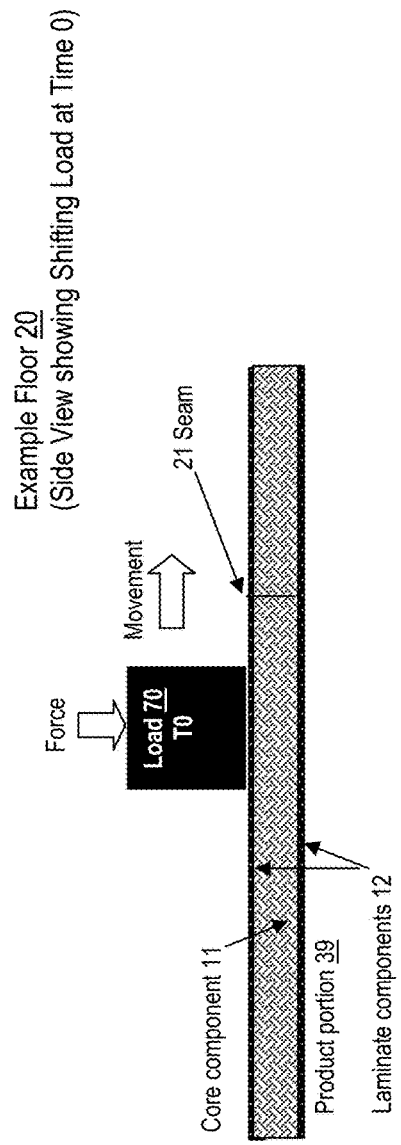
FIG. 7C depicts a side view of the example floor with the shifting load at the first time, according to an embodiment of the present invention.
Figure 7D:
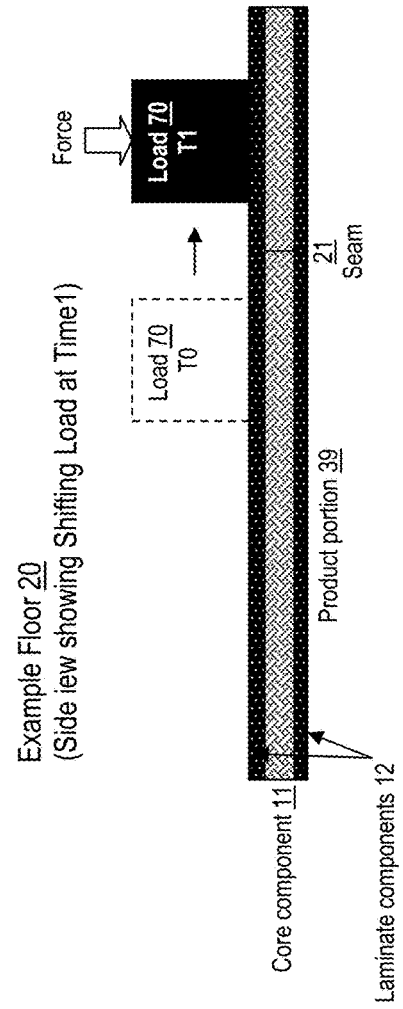
FIG. 7D depicts a side view of the example floor with the shifting load (shown in FIG. 7C) at the second time, according to an embodiment of the present invention.

FIG. 7C depicts a side view of the example floor 20 with the shifting load 70 at the first time T0, according to an embodiment of the present invention. At the first time T0, the load 70 exerts a downward force on the floor 20 at its first position relative to the seam 21. FIG. 7D depicts a side view of the example floor 20 with the shifting load 70 (shown in FIG. 7C) at the second time T1, according to an embodiment of the present invention. At the second time T1, the load 70 has shifted over the horizontal surface of the floor 20 in relation to the seam 21.

At the second time T1, the load 70 exerts a downward force on the floor 20 at its second position relative to the seam 21. Notwithstanding the downward force exerted by the load 70 shifting from the first position to the second position relative to the seam 21, the floor is operable for bearing the load without significant localized displacements. The laminate component 12 reinforces the product portion 39 from which the floor 20 is constructed. Thus, the floor 20 resists localized displacement from loads shifting across the floor 20 relative to the seam 21. The weight of the example load 70 may match the weight of users of the floors, furniture or other objects in the assemblies, or it may match or approximate a weight associated with other loads (e.g., load 85; FIG. 8A-8D).

Thus, example embodiments of the present invention are described in relation to deck flooring materials and products, which may be used in vehicles such as RVs and trailers and in MHUs. The product comprises a plurality of planar core substrate components, each of which has opposing straight longitudinal and lateral edges. A first lateral edge of a second of the substrate components abuts a first lateral edge of a first of the substrate components to form a common seam between them. The first and second of the substrate components are adjacent relative to a sequential array of multiple substrate components, which runs in a direction parallel to the pair of longitudinal edges. The product has a pair of laminate components affixed to each side of each of the substrate components continuously over the sequential array thereof. The laminate components strengthen the product in relation to bearing a load applied to the second surface thereof and each of the common seams. The laminate components may be affixed to each side of each of the core substrate components with an adhesive component. Example embodiments are also thus described in relation to processes and systems for manufacturing the product and to RV, trailer and MHU assemblies manufactured with flooring installations, which use the product.

Further, example embodiments of the present invention are thus described in relation to processes and systems for using the material for manufacturing the product. An example process comprises arraying a linear sequence of each of the plurality of planar substrate components wherein, in a direction of a movement of the linear sequence parallel to each of a pair of opposite longitudinal edges, a trailing lateral edge of a first of the planar substrate components abuts a leading edge of a second of the planar substrate components. The pair of linear laminate components is fed continuously in a direction and at a speed that matches the movement of the linear sequence of substrate components. The linear laminate components of the pair have a thickness between a first side and a second side opposite from the first side thereof and a width between two parallel longitudinal edges thereof. The adhesive component is applied continuously to each side of each of the substrate components in the linear sequence thereof and/or to the facing side of the linear laminate component.

The outer surface of each of the substrate components is attached to facing side of each of the linear laminate components to form an intermediate assembly. The intermediate assembly has a pair of opposite outer surfaces, each comprising the outer surface of each of the laminate components thereof and a second surface opposite from the first surface. The outer surfaces of the intermediate assembly are mechanically compressed. During the mechanical compression thereof, the outer surfaces of the intermediate assembly are heated at the same time. Upon the simultaneous mechanical compression and heating, the substrate component and the laminate components are securely affixed to each other to form the product. In an example embodiment, the product is cut to form a plurality of portions of the product. In an example embodiment, a manufacturing system performs the process for producing the product.

While example embodiments of the present invention are described as presented herein, it should be apparent to ordinarily skilled artisans in related technologies that variations and modifications of the example embodiments so described may be made without departing from the concept, scope and breadth of embodiments of the invention. An embodiment of the invention is defined to the full extent covered by the claims recited below and equivalents thereof, as interpreted by rules and principles of applicable law.

What is claimed is:

1. A product comprising:
    a plurality of planar substrate components, each planar substrate component having opposite straight longitudinal edges, and a first lateral edge and a second lateral edge opposite from the first lateral edge, wherein the first lateral edge of a second of the plurality of planar substrate components abuts the second lateral edge of a first of the plurality of planar substrate components to form a common seam, and wherein the first and the second of the plurality of planar substrate components are adjacent to each other in relation to a sequential array of the plurality of planar substrate components, wherein the sequential array runs in a direction parallel to longitudinal edges; and
    a pair of laminate components affixed to both an upper surface and a lower surface of each of the plurality of planar substrate component, wherein each laminate component is continuous over the sequential array, wherein the pair of laminate components strengthen the product in relation to bearing a load applied to a surface of the product and each common seam, wherein the product has a length adapted to an overall length of at least one of a recreational vehicle, a trailer and a manufactured housing unit.

2. The product as recited in claim 1 wherein the planar substrate component comprises one or more of:
    a wood veneer based material;
    a fiberboard based material; and
    a fiberglass based material.

3. The product as recited in claim 2 wherein the fiberboard based material comprises at least one or more of:
    high density fiberboard; and
    medium density fiberboard.

4. The product as recited in claim 1, wherein each of the pair of laminate components comprises one or more of:
    a paper material;
    a linerboard material;
    a plastic material; and
    a composite material.

5. The product as recited in claim 1, further comprising an adhesive component disposed between a surface of each side of the planar substrate component and the laminate component wherein the laminate component and the planar substrate component are affixed together with the adhesive component.

6. The product as recited in claim 5 wherein the adhesive component comprises polyvinyl acetate.

7. The product as recited in claim 1 wherein each planar substrate component has a lateral dimension within 70 inches to 102 inches.

8. The product as recited in claim 1 wherein each of the plurality of planar substrate components has a dimension of four feet by eight feet.

9. The product as recited in claim 1 wherein each of the plurality of planar substrate components has a thickness within 2.3 to 19 millimeters.

10. The product as recited in claim 1 wherein the laminate component has a thickness within #33 ply to #90 ply.

11. A method for producing a product for use in vehicle deck floors, the method comprising:
    arraying a linear sequence of a plurality of planar substrate components wherein, in a direction of a movement of the linear sequence parallel to each of a pair of opposite longitudinal edges, a trailing lateral edge of a first of the planar substrate components abuts a leading edge of a second of the planar substrate components;
    feeding a pair of linear laminate components continuously in a direction and at a speed that matches the movement of the linear sequence, wherein each of the linear laminate components of the pair has a thickness between a first side and a second side opposite from the first side thereof and a width between two parallel longitudinal edges thereof;

applying an adhesive component continuously to each side of each of the planar substrate components and a side of each linear laminate component of the pair facing the planar substrate components;

attaching the each of the planar substrate components to a facing side of the linear laminate component to form an intermediate assembly, the intermediate assembly having a outer surface comprising an outer surface of each of the pair of linear laminate components and an inner portion comprising the planar substrate components;

mechanically compressing the outer surfaces of the intermediate assembly; and heating the outer surfaces of the intermediate assembly during the mechanically compressing wherein, upon the mechanically compressing and the heating, the planar substrate component and the laminate components are securely affixed to each other.

12. The method for producing a product as recited in claim 11, further comprising cutting the product to form a single piece of deck flooring having a length adapted to an overall length of at least one of a recreational vehicle, a trailer and a manufactured housing unit.

13. The method for producing a product as recited in claim 12 wherein the cutting the product comprises cutting across an entire thickness of the product wherein upon the cutting, a plurality of product portions are separated from each other by a cut that is perpendicular to a longitudinal axis of the product.

14. The method for producing a product as recited in claim 13, further comprising moving the product at a speed that is based on a movement speed of the linear substrate sequence and wherein the cutting across the entire thickness parallel to the lateral axis of the product comprises moving a cutter across the product from a first longitudinal edge to a second longitudinal edge thereof at an angle and with a speed along a ray of an angle diagonal to the longitudinal edges, which is based on a product movement speed.

15. The method as recited in claim 11 wherein the plurality of planar substrate components comprise one or more of:
  a wood veneer based material;
  a fiberboard based material; and
  a fiberglass based material.

16. The method as recited in claim 10 wherein the laminate material comprises one or more of:
  a paper material;
  a linerboard material;
  a plastic material; and
  a composite material.

17. The method as recited in claim 11 wherein the adhesive component comprises polyvinyl acetate and wherein the applying the adhesive component comprises:
  aerosolizing the adhesive component; and
  spraying the aerosolized adhesive component to the one or more of the first side of each of the planar substrate components and the second side of the linear laminate component.

18. The method as recited in claim 11 wherein the heating the first and the second surfaces of the intermediate assembly comprises heating each of the first and the second intermediate assembly surfaces to a temperature of 350 to 400 degrees Fahrenheit, inclusive, during the mechanically compressing thereof.

19. A product for use in vehicle deck floors and produced by a process, the process comprising the steps of:
  arraying a linear sequence of each of a plurality of planar substrate components wherein, in a direction of a movement of the linear sequence, a trailing lateral edge of a first of the planar substrate components abuts a leading trailing edge of a second of the planar substrate components;
  feeding a pair of linear laminate components continuously in a direction and at a speed that matches the movement of the linear sequence of planar substrate components wherein each linear laminate component has a thickness between a first side and a second side opposite from the first side thereof and a width between two parallel longitudinal edges thereof;
  applying an adhesive component continuously to each side of each of the planar substrate components and a side of each of the pair of the linear laminate components facing the planar substrate components;
  attaching each of the planar substrate components to each of the pair of the linear laminate components to form an intermediate assembly, the intermediate assembly having a pair of opposite outer surfaces comprising an outer surface of each of the laminate components of the pair;
  mechanically compressing the outer surfaces of the intermediate assembly;
  heating the outer surfaces of the intermediate assembly during the mechanically compressing wherein, upon the mechanically compressing and the heating, the planar substrate component and each of the pair of the linear laminate components are securely affixed to each other; and
  cutting the product to accommodate an entire length of at least one of a recreational vehicle, a trailer and a manufactured housing unit.

20. A vehicle floor assembly, comprising:
  a chassis;
  a floor frame fastened to an upper surface of the chassis wherein at least a portion of a bottom surface of the floor frame, which is opposite form an upper surface thereof, abuts at least a portion of an upper surface of the chassis; and
  a single piece flooring deck material with an upper surface and a lower surface opposite therefrom wherein the lower surface of the flooring deck is affixed to the upper surface of the flooring frame and wherein the flooring deck comprises a floor decking product, the flooring deck product comprising:
    a plurality of planar substrate components, each of the planar substrate components having opposite straight longitudinal edges, and a first lateral straight edge and a second lateral edge opposite from the first lateral edge, wherein the first lateral edge of a second of the plurality of planar substrate components abuts the first edge of a first of the plurality of planar substrate components to form a seam common to each, and wherein the first and the second of the plurality of planar substrate components are adjacent to each other in relation to a sequential array of the plurality of planar substrate components, which extends in a direction parallel to the pair of longitudinal edges; and
    a pair of laminate components affixed to each side of each of the plurality of planar substrate components continuously over the sequential array thereof, wherein the pair of laminate components strengthen the product in relation to bearing a load applied to the second surface thereof and each common seam, wherein the product is made in a length adapted to an overall length of a vehicle operable to use the vehicle floor assembly.

21. The vehicle floor assembly as recited in claim 20 wherein the vehicle comprises one or more of a recreational vehicle or a trailer.

* * * * *